US012640886B2

(12) United States Patent
Wang et al.

(10) Patent No.: US 12,640,886 B2
(45) Date of Patent: May 26, 2026

(54) DEFAULT SPATIAL RELATION FOR UPLINK TRANSMISSION

(71) Applicant: Intel Corporation, Santa Clara, CA (US)

(72) Inventors: Guotong Wang, Beijing (CN); Alexei Davydov, Nizhny Novgorod (RU); Bishwarup Mondal, San Ramon, CA (US)

(73) Assignee: Intel Corporation, Santa Clara, CA (US)

( * ) Notice: Subject to any disclaimer, the term of this patent is extended or adjusted under 35 U.S.C. 154(b) by 665 days.

(21) Appl. No.: 17/923,756

(22) PCT Filed: Jul. 8, 2021

(86) PCT No.: PCT/US2021/040917
§ 371 (c)(1),
(2) Date: Nov. 7, 2022

(87) PCT Pub. No.: WO2022/011159
PCT Pub. Date: Jan. 13, 2022

(65) Prior Publication Data
US 2023/0198719 A1 Jun. 22, 2023

(30) Foreign Application Priority Data

Jul. 9, 2020 (WO) ............... PCT/CN2020/101015
Jul. 14, 2020 (WO) ............... PCT/CN2020/101784
(Continued)

(51) Int. Cl.
*H04L 5/00* (2006.01)
*H04B 7/06* (2006.01)
*H04W 72/20* (2023.01)

(52) U.S. Cl.
CPC ....... *H04L 5/0053* (2013.01); *H04B 7/06968* (2023.05); *H04L 5/0035* (2013.01); *H04L 5/0048* (2013.01); *H04W 72/20* (2023.01)

(58) Field of Classification Search
CPC ... H04B 7/024; H04B 7/06968; H04L 5/0035; H04L 5/0044; H04L 5/0048;
(Continued)

(56) References Cited

U.S. PATENT DOCUMENTS

2022/0345903 A1* 10/2022 Liu ........................ H04W 16/28

FOREIGN PATENT DOCUMENTS

WO WO-2020056180 A1 3/2020
WO WO-2022011159 A1 1/2022

OTHER PUBLICATIONS

OPPO ("Discussion on Multi-beam Operation Enhancements"; 3GPP TSG RAN WG1 #98bis; Chongqing, China, Oct. 14-20, 2019; R1-1910117) (Year: 2019).*
(Continued)

*Primary Examiner* — Asad M Nawaz
*Assistant Examiner* — Natali Pascual Peguero
(74) *Attorney, Agent, or Firm* — Schwegman Lundberg & Woessner, P.A.

(57) ABSTRACT

Systems, devices, and methods to enable multi-TRP operation with a single DCI and with multiple DCI are described. A single DCI or multiple DCIs for the TRPs are used for PUCCH transmissions, PUSCH transmissions and SRS transmissions. The spatial relations are provided between
(Continued)

CORESET reception and PUCCH/PUSCH transmission or SRS repetition. Associations are defined at different levels and default spatial relations are indicated by RRC signaling.

17 Claims, 28 Drawing Sheets

(30)          Foreign Application Priority Data

Jul. 20, 2020    (WO) ................ PCT/CN2020/102957
Jul. 20, 2020    (WO) ................ PCT/CN2020/102993

(58)   Field of Classification Search
       CPC ...  H04L 5/0053; H04L 5/0094; H04L 5/0005;
                H04L 5/0023; H04L 5/0051; H04W 72/20
       See application file for complete search history.

(56)              References Cited

OTHER PUBLICATIONS

Apple Inc. ("Remaining Issues on Multi-beam operation"; 3GPP TSG RAN WG1 #101; e-Meeting, May 25-Jun. 5, 2020; R1-2004230) (Year: 2020).*

Moderator (OPPO) ("Summary of email thread [101-e-NR-eMIMO-multiTRP-02]"; 3GPP TSG RAN WG1 #101; e-Meeting, May 20-Jun. 5, 2020; R1-2004908) (Year: 2020).*
"Analysis of RRC impacts from multi-beam enhancements", Ericsson, R2-1913013, 3GPP TSG-RANWG2 #107bis, Chongqing, P.R. China, (Oct. 3, 2019).
"International Application Serial No. PCT/US2021/040917, International Search Report mailed Nov. 1, 2021", 4 pgs.
"International Application Serial No. PCT/US2021/040917, Written Opinion mailed Nov. 1, 2021", 5 pgs.
"Remaining Issues on Multi-beam operation", Apple Inc. R1-2004230, 3GPP TSG RAN WG1 #101, e-Meeting, (May 16, 2020).
"Summary of email thread [101-e-NR-eMIMO-multiTRP-02]", Moderator (OPPO), RI-2004908, 3GPP TSG RAN WG1 #101, e-Meeting, (Jun. 4, 2020).
OPPO, "Discussion on Multi-beam Operation Enhancements", R1-1910117, 3GPP TSG RAN WG1 #98bis, Chongqing, China, (Oct. 4, 2019), 15 pgs.
"International Application Serial No. PCT/US2021/040917, International Preliminary Report on Patentability mailed Jan. 19, 2023", 9 pgs.
Qualcomm Incorporated, "Enhancements on Multi-beam Operation", R1-1912968, 3GPP TSG-RAN WG1 Meeting #99, Discussion/Decision, 20 pgs.

* cited by examiner

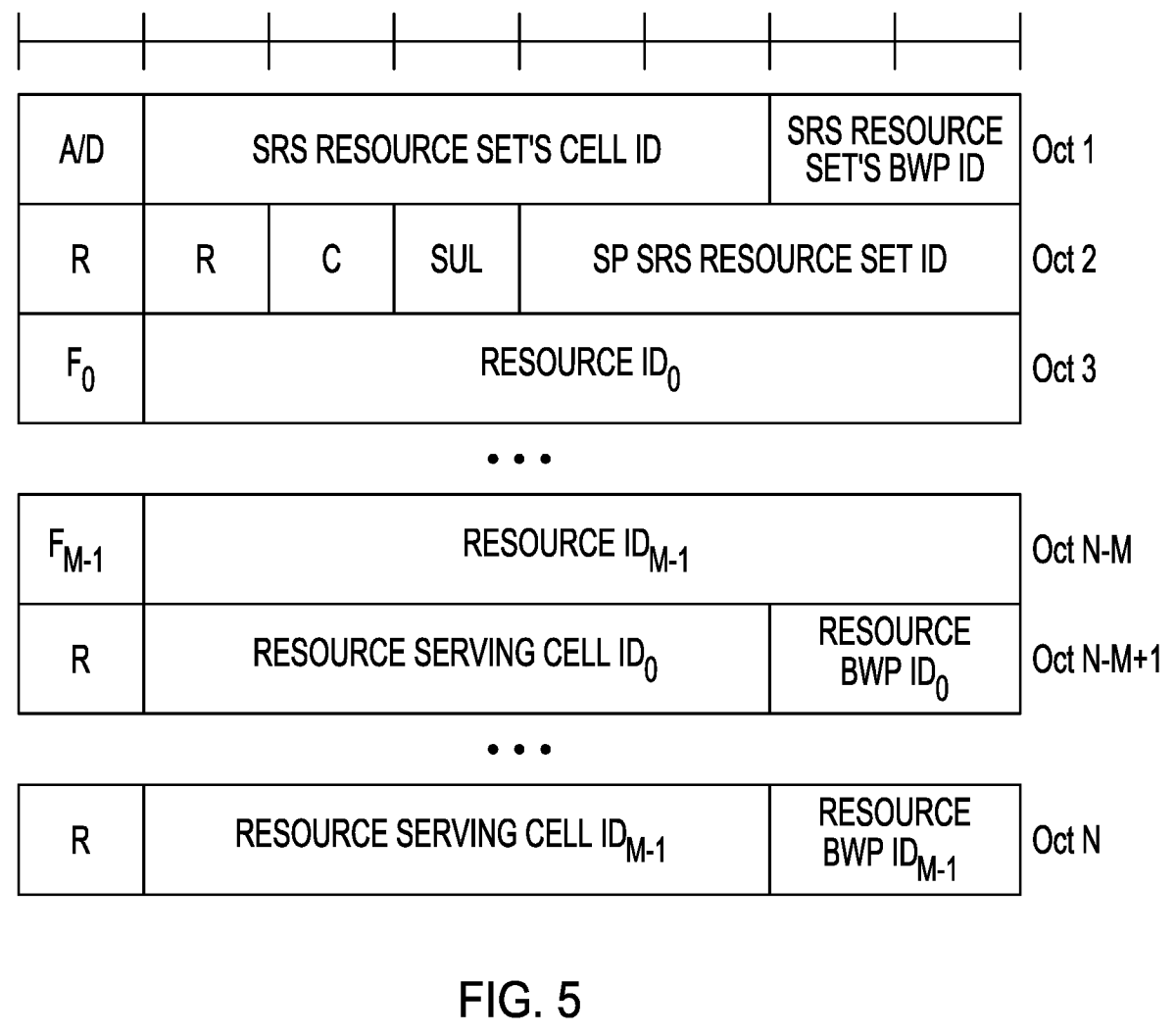

| | | | | | | | |
|---|---|---|---|---|---|---|---|
| A/D | SRS RESOURCE SET'S CELL ID | | | | SRS RESOURCE SET'S BWP ID | | Oct 1 |
| R | C | SUL | SP SRS RESOURCE SET ID | | | | Oct 2 |
| $F_0$ | RESOURCE $ID_0$ | | | | | | Oct 3 |

$\vdots$

| | | | | |
|---|---|---|---|---|
| $F_{M-1}$ | RESOURCE $ID_{M-1}$ | | | Oct N-M |
| R | RESOURCE SERVING CELL $ID_0$ | | RESOURCE BWP $ID_0$ | Oct N-M+1 |

$\vdots$

| | | | |
|---|---|---|---|
| R | RESOURCE SERVING CELL $ID_{M-1}$ | RESOURCE BWP $ID_{M-1}$ | Oct N |

FIG. 5

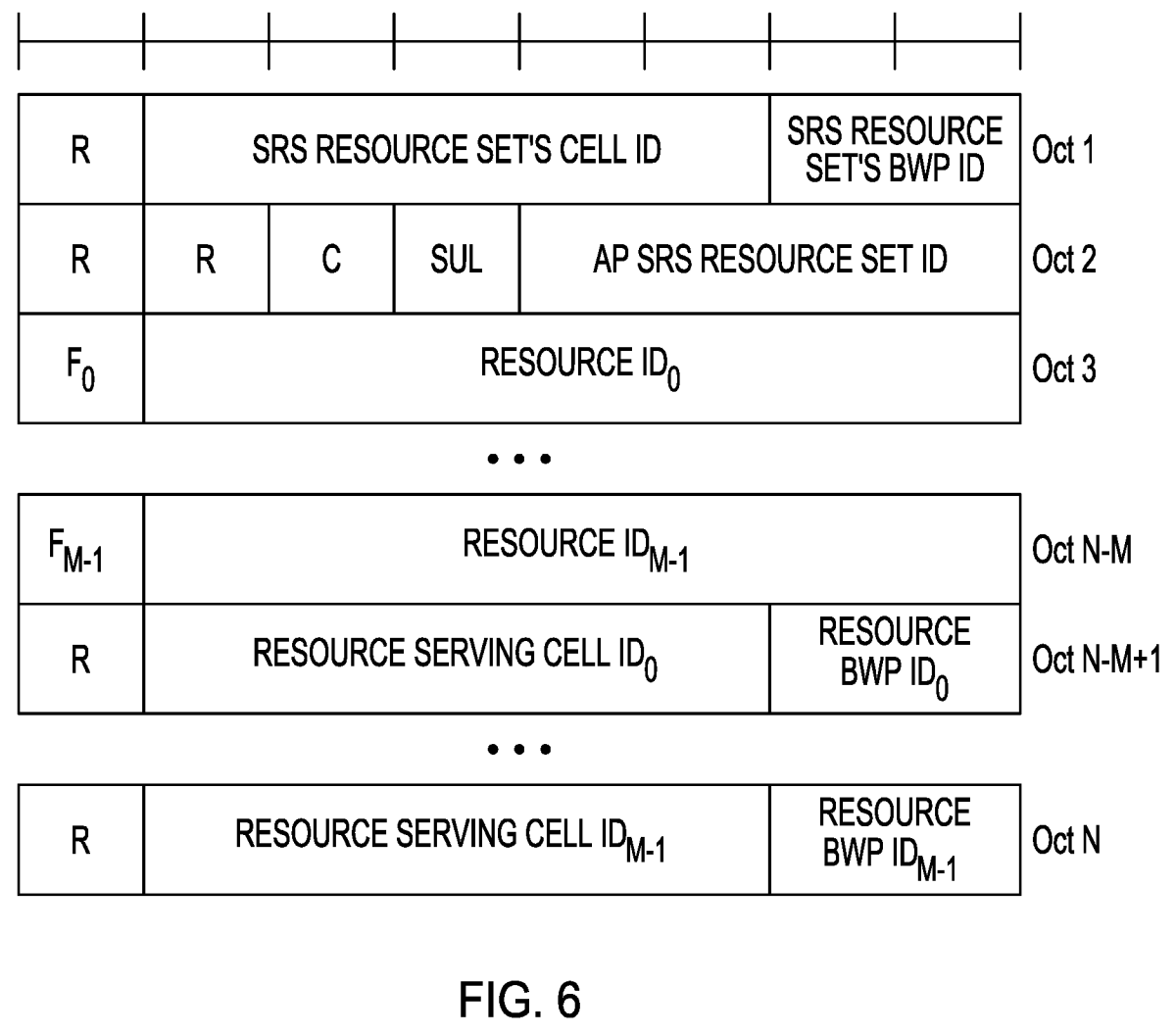

| | | | | | | | | |
|---|---|---|---|---|---|---|---|---|
| R | SRS RESOURCE SET'S CELL ID | | | | | SRS RESOURCE SET'S BWP ID | | Oct 1 |
| R | R | C | SUL | AP SRS RESOURCE SET ID | | | | Oct 2 |
| $F_0$ | RESOURCE $ID_0$ | | | | | | | Oct 3 |

⋮

| | | | |
|---|---|---|---|
| $F_{M-1}$ | RESOURCE $ID_{M-1}$ | | Oct N-M |
| R | RESOURCE SERVING CELL $ID_0$ | RESOURCE BWP $ID_0$ | Oct N-M+1 |

⋮

| | | | |
|---|---|---|---|
| R | RESOURCE SERVING CELL $ID_{M-1}$ | RESOURCE BWP $ID_{M-1}$ | Oct N |

FIG. 6

(a) Activated TCI states for PDSCH (a) Activated TCI states for PDSCH

DEFAULT SPATIAL RELATION FOR UPLINK TRANSMISSION

PRIORITY CLAIM

This application is a U.S. National Stage Filing under 35 U.S.C. 371 from International Application No. PCT/US2021/040917, filed Jul. 8, 2021 and published in English as WO 2022/011159 on Jan. 13, 2022, 2022, which claims the benefit of priority to PCT Patent Application Serial No. PCT/CN2020/101015, filed Jul. 9, 2020, PCT Patent Application Serial No. PCT/CN2020/101784, filed Jul. 14, 2020, PCT Patent Application Serial No. PCT/CN2020/102957, filed Jul. 20, 2020, and PCT Patent Application Serial No. PCT/CN2020/102993, filed Jul. 20, 2020, each of which is incorporated herein by reference in its entirety.

TECHNICAL FIELD

Embodiments pertain to wireless communications in $5^{th}$ generation (5G)/new radio (NR) systems. Some embodiments relate to multi-Transmission/Reception Point (TRP) operation in 5G systems.

BACKGROUND

The use and complexity of 3GPP LTE systems (including LTE and LTE-Advanced systems) has increased due to both an increase in the types of devices user equipment (UEs) using network resources as well as the amount of data and bandwidth being used by various applications, such as video streaming, operating on these UEs. With the vast increase in number and diversity of communication devices, the corresponding network environment, including routers, switches, bridges, gateways, firewalls, and load balancers, has become increasingly complicated, especially with the advent of 5G systems. As expected, a number of issues abound with the advent of any new technology.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

FIG. 5 illustrates a MAC-CE to update spatial relation for semi-persistent sounding reference signals (SRS) in accordance with some embodiments.

FIG. 6 illustrates a MAC-CE to update spatial relation for aperiodic SRS in accordance with some embodiments.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
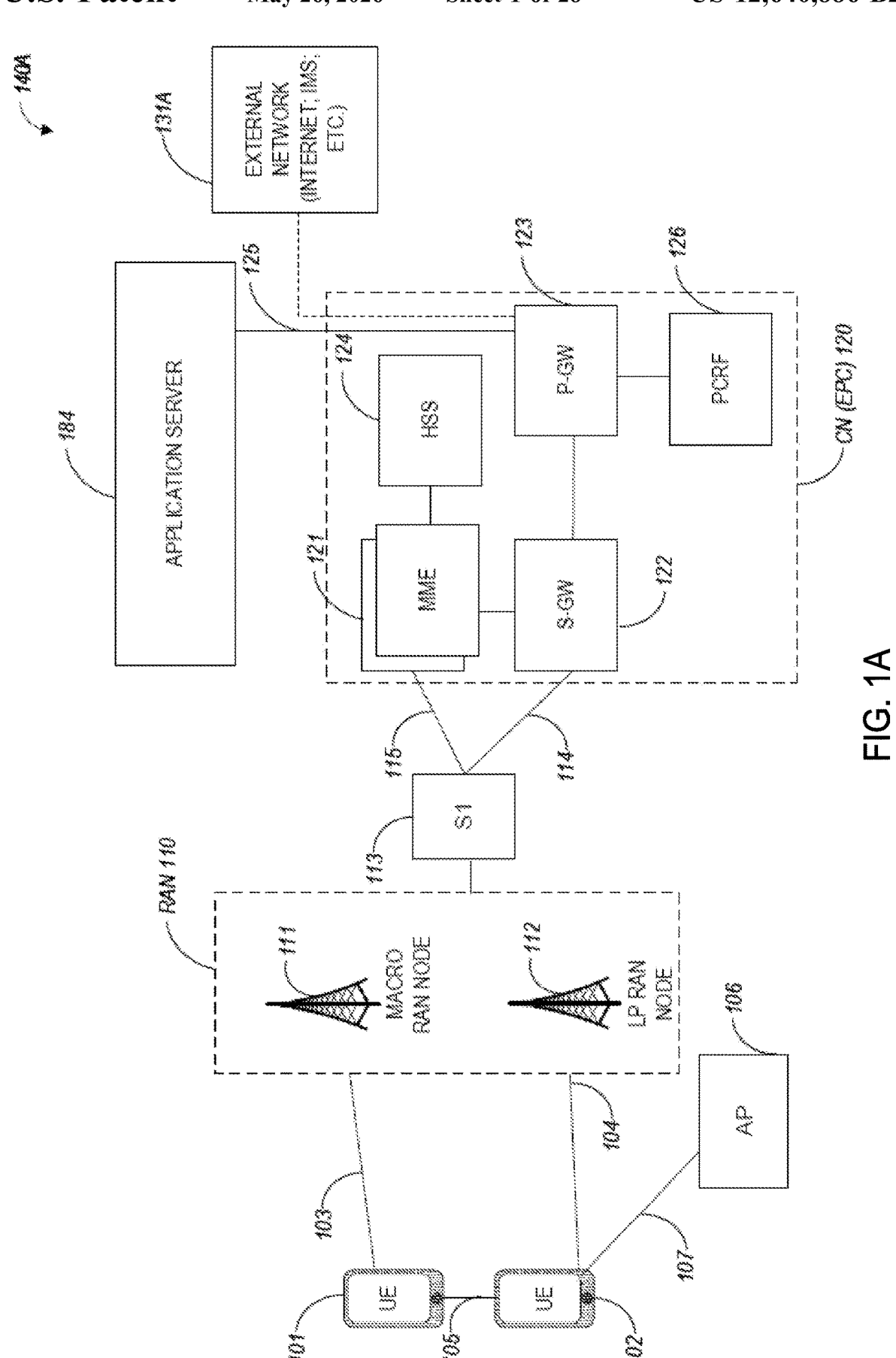
FIG. 1A illustrates an architecture of a network, in accordance with some aspects.

FIG. 1A illustrates an architecture of a network in accordance with some aspects. The network 140A includes 3GPP LTE/4G and NG network functions. A network function can be implemented as a discrete network element on a dedicated hardware, as a software instance running on dedicated hardware, and/or as a virtualized function instantiated on an appropriate platform, e.g., dedicated hardware or a cloud infrastructure.

The network 140A is shown to include user equipment (UE) 101 and UE 102. The UEs 101 and 102 are illustrated as smartphones (e.g., handheld touchscreen mobile computing devices connectable to one or more to cellular networks) but may also include any mobile or non-mobile computing device, such as portable (laptop) or desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard. Any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and other frequencies and Spectrum Access System (SAS) in 3.55-3.7 GHz and other frequencies). Different Single Carrier or Orthogonal Frequency Domain Multiplexing (OFDM) modes (CP-OFDM, SC-FDMA, SC-OFDM, filter bank-based multicarrier (FBMC), OFDMA, etc.), and in particular 3GPP NR, may be used by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN.

The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), a Physical Sidelink Broadcast Channel (PSBCH), and a Physical Sidelink Feedback Channel (PSFCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a gNB, an eNB, or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G network, including 5G new radio network using communications in the licensed (5G NR) and the unlicensed (5G NR-U) spectrum. One of the current enablers of IoT is the narrowband-IoT (NB-IoT). Operation in the unlicensed spectrum may include dual connectivity (DC) operation and the standalone LTE system in the unlicensed spectrum, according to which LTE-based technology solely operates in unlicensed spectrum without the use of an "anchor" in the licensed spectrum, called Multe-Fire. Further enhanced operation of LTE systems in the licensed as well as unlicensed spectrum is expected in future releases and 5G systems. Such enhanced operations can include techniques for sidelink resource allocation and UE processing behaviors for NR sidelink V2X communications.

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes as provided by 3GPP Technical Specification (TS) 23.501 (e.g., V15.4.0, December 2018). In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
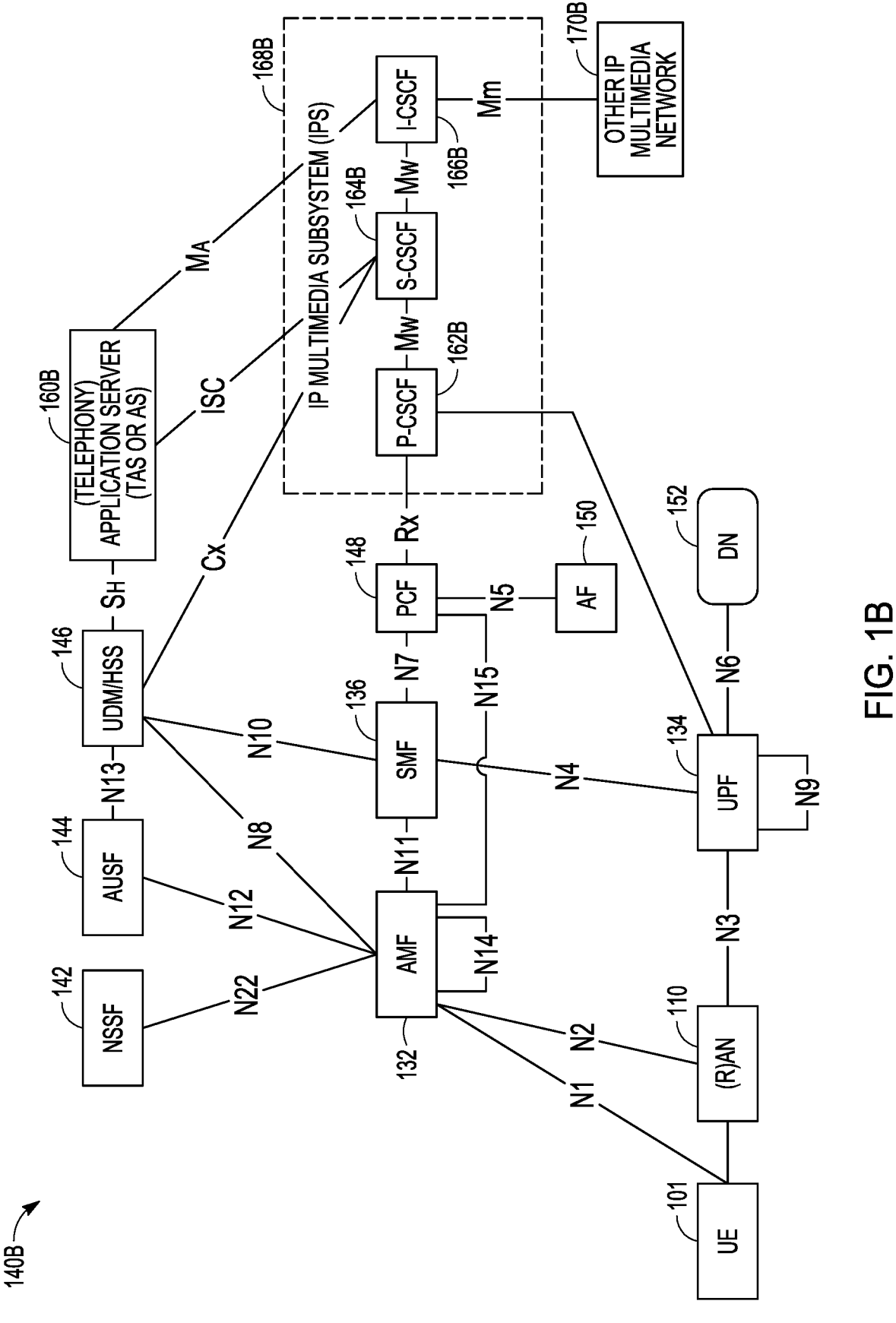
FIG. 1B illustrates a non-roaming 5G system architecture in accordance with some aspects.

FIG. 1B illustrates a non-roaming 5G system architecture in accordance with some aspects. In particular, FIG. 1B illustrates a 5G system architecture 140B in a reference point representation. More specifically, UE 102 can be in communication with RAN 110 as well as one or more other 5GC network entities. The 5G system architecture 140B includes a plurality of network functions (NFs), such as an AMF 132, session management function (SMF) 136, policy control function (PCF) 148, application function (AF) 150, UPF 134, network slice selection function (NSSF) 142, authentication server function (AUSF) 144, and unified data management (UDM)/home subscriber server (HSS) 146.

The UPF 134 can provide a connection to a data network (DN) 152, which can include, for example, operator services, Internet access, or third-party services. The AMF 132 can be used to manage access control and mobility and can also include network slice selection functionality. The AMF 132 may provide UE-based authentication, authorization, mobility management, etc., and may be independent of the access technologies. The SMF 136 can be configured to set up and manage various sessions according to network policy. The SMF 136 may thus be responsible for session management and allocation of IP addresses to UEs. The SMF 136 may also select and control the UPF 134 for data transfer. The SMF 136 may be associated with a single session of a UE 101 or multiple sessions of the UE 101. This is to say that the UE 101 may have multiple 5G sessions. Different SMFs may be allocated to each session. The use of different SMFs may permit each session to be individually managed. As a consequence, the functionalities of each session may be independent of each other.

The UPF 134 can be deployed in one or more configurations according to the desired service type and may be connected with a data network. The PCF 148 can be configured to provide a policy framework using network slicing, mobility management, and roaming (similar to PCRF in a 4G communication system). The UDM can be configured to store subscriber profiles and data (similar to an HSS in a 4G communication system).

The AF 150 may provide information on the packet flow to the PCF 148 responsible for policy control to support a desired QoS. The PCF 148 may set mobility and session management policies for the UE 101. To this end, the PCF 148 may use the packet flow information to determine the appropriate policies for proper operation of the AMF 132 and SMF 136. The AUSF 144 may store data for UE authentication.

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:
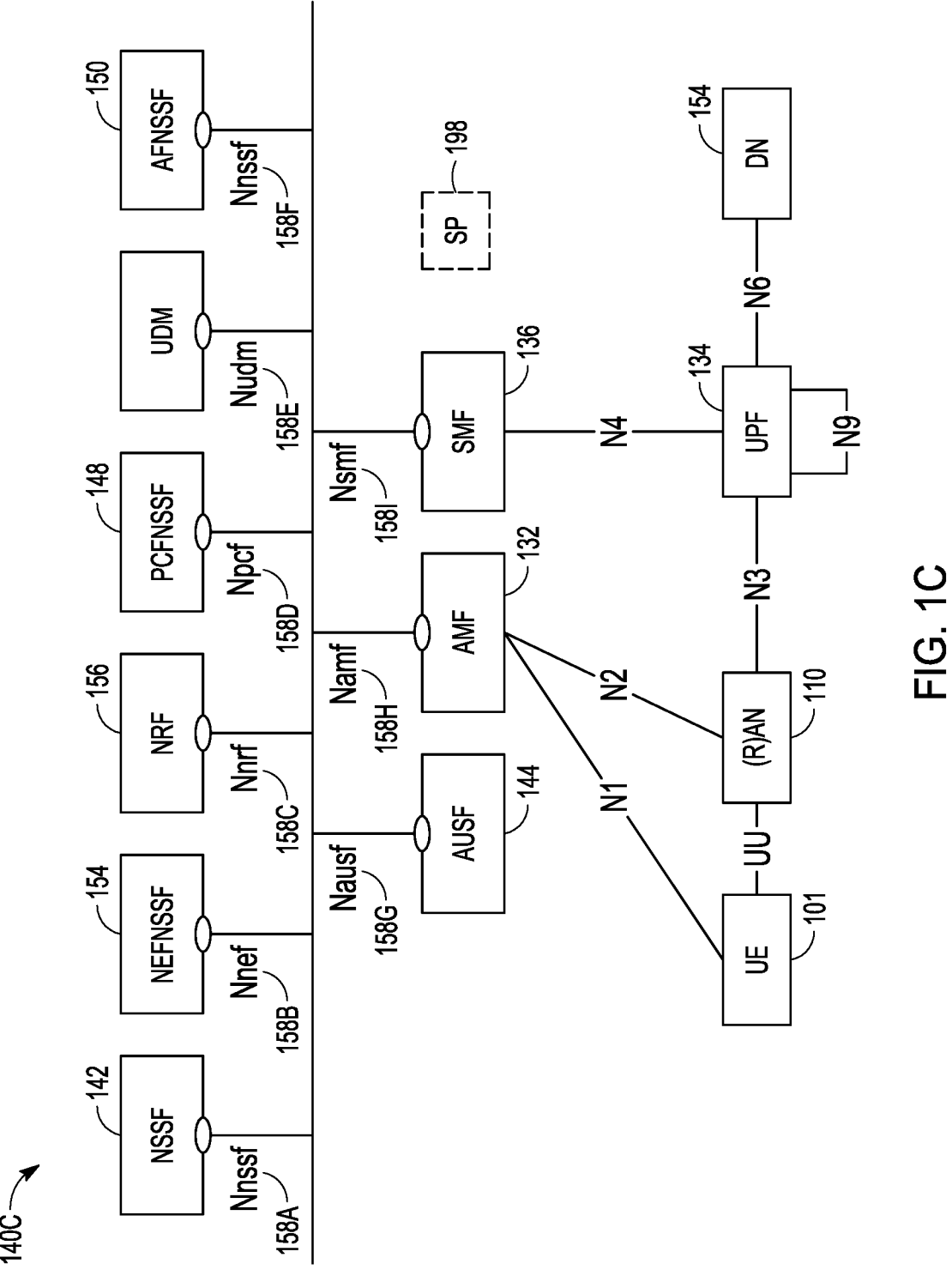
FIG. 1C illustrates a non-roaming 5G system architecture in accordance with some aspects.

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

NR-V2X architectures may support high-reliability low latency sidelink communications with a variety of traffic patterns, including periodic and aperiodic communications with random packet arrival time and size. Techniques disclosed herein can be used for supporting high reliability in distributed communication systems with dynamic topologies, including sidelink NR V2X communication systems.

Figure 2:
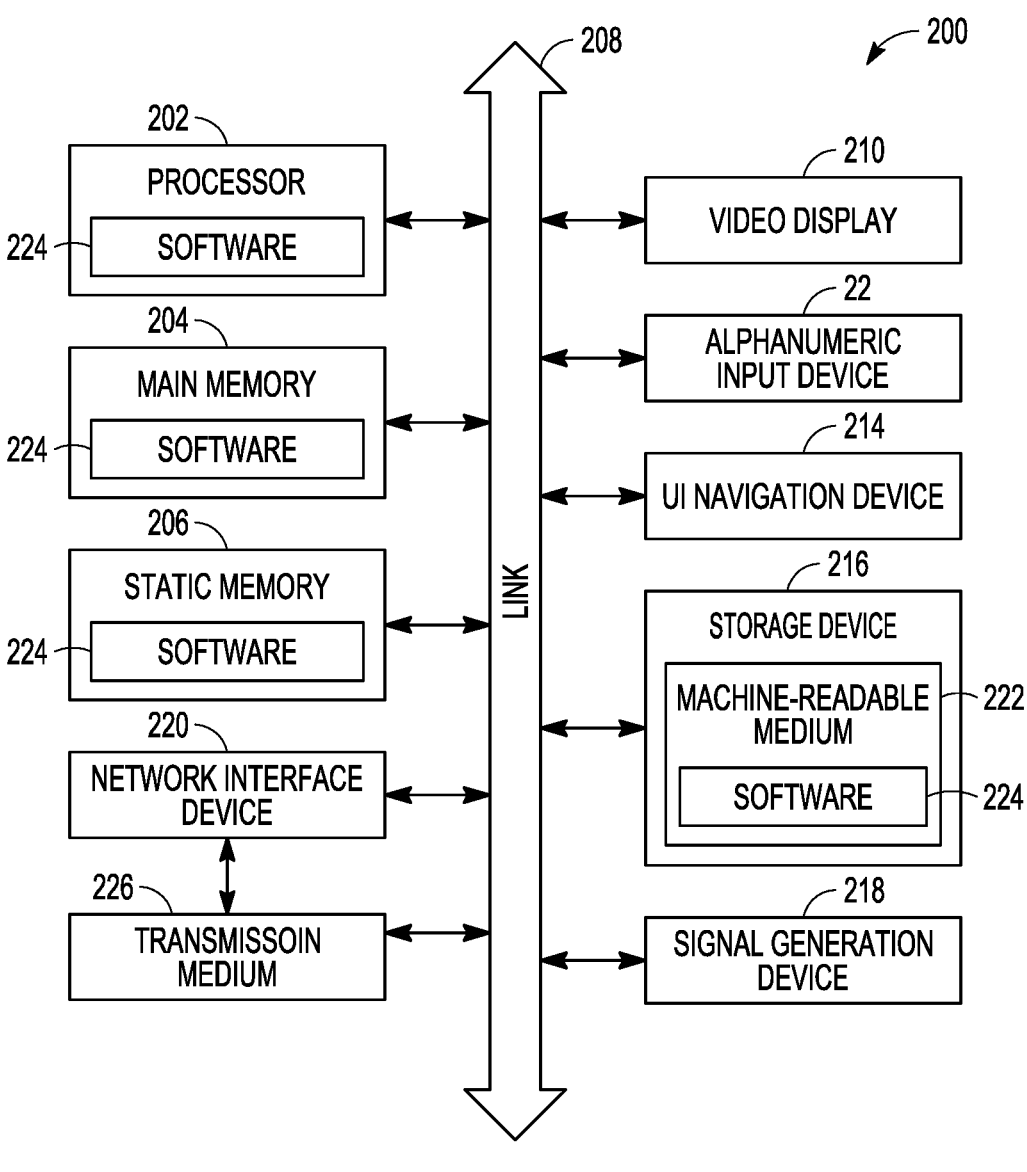
FIG. 2 illustrates a block diagram of a communication device in accordance with some embodiments.

FIG. 2 illustrates a block diagram of a communication device in accordance with some embodiments. The communication device 200 may be a UE such as a specialized computer, a personal or laptop computer (PC), a tablet PC, or a smart phone, dedicated network equipment such as an eNB, a server running software to configure the server to operate as a network device, a virtual device, or any machine capable of executing instructions (sequential or otherwise) that specify actions to be taken by that machine. For example, the communication device 200 may be implemented as one or more of the devices shown in FIGS. 1A-1C. Note that communications described herein may be encoded before transmission by the transmitting entity (e.g., UE, gNB) for reception by the receiving entity (e.g., gNB, UE) and decoded after reception by the receiving entity.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor (or equivalently processing circuitry) 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Radio access Memory (RAM); and CD-ROM and DVD-ROM disks.

The instructions 224 may further be transmitted or received over a communications network using a transmission medium 226 via the network interface device 220 utilizing any one of a number of wireless local area network (WLAN) transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a next generation (NG)/$5^{th}$ generation (5G) standards among others. In an example, the network interface device 220 may include one or more physical jacks (e.g., Ethernet, coaxial, or phone jacks) or one or more antennas to connect to the transmission medium 226.

Note that the term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical central processing unit (CPU), a single- or multi-core processor, and/or any other device capable of executing or otherwise operating computer-executable instructions, such as program code, software modules, and/or functional processes.

Figure 3A:
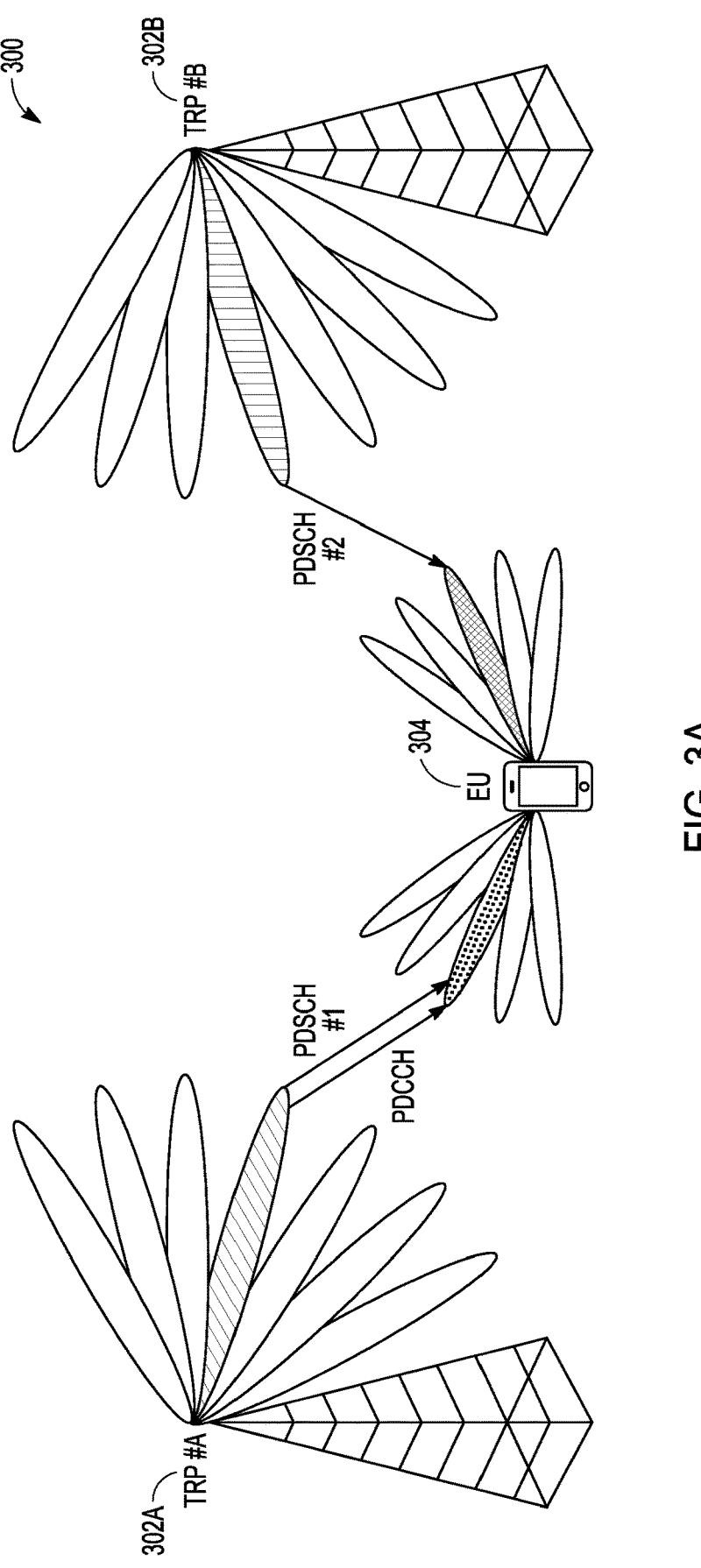
FIG. 3A illustrates single Downlink Control Information (DCI) TRP operation in accordance with some embodiments.
Figure 3B:
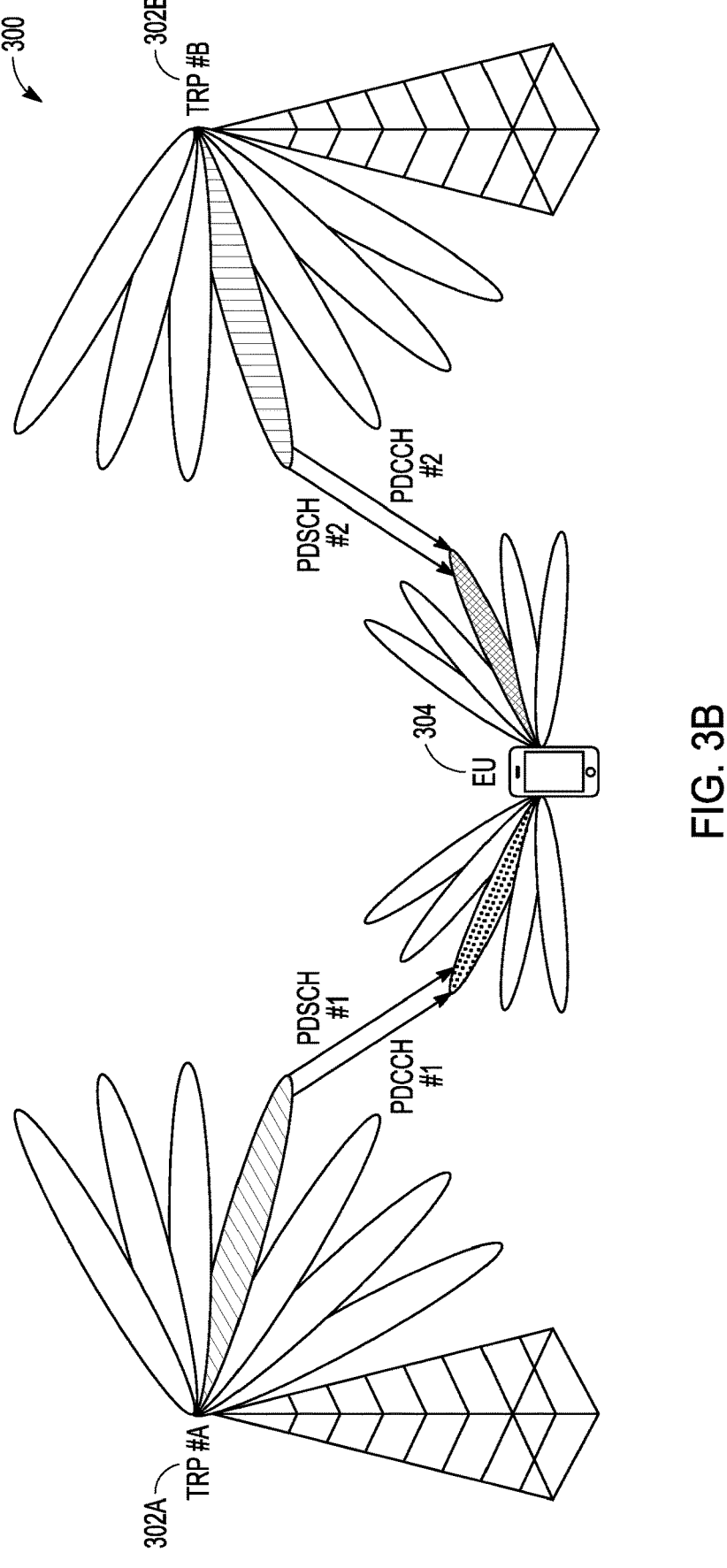
FIG. 3B illustrates multi-DCI TRP operation in accordance with some embodiments.

In 5G NR Rel-16, multi-TRP operation was introduced. In 5G NR Rel-16, multi-TRP operation was used for the physical downlink shared channel (PDSCH). Depending on different backhaul assumptions (ideal backhaul and non-ideal backhaul), multi-TRP operation includes single DCI operation and multi-DCI operation. FIG. 3A illustrates single Downlink Control Information (DCI) TRP operation in accordance with some embodiments. FIG. 3B illustrates multi-DCI TRP operation in accordance with some embodiments. Note that for convenience, only some elements are shown; others may be present. As shown in FIGS. 3A and 3B, the system 300 includes multiple TRPs (TRP #A 302a, TRP #B 302b) in communication with a UE 304. TRP #A 302a and TRP #B 302b may each transmit PDSCHs using different beams. One of the PDSCHs from each TRP #A 302a and TRP #B 302b may be received by UE 304.

Single-DCI operation, such as that shown in FIG. 3A, can be employed with the assumption of the ideal backhaul. With single-DCI operation, a single physical downlink control channel (PDCCH) transmission may schedule the PDSCH transmissions from multiple TRPs. This is shown in FIG. 3A as PDSCH #1 from TRP #A 302a scheduling following PDCCH from TRP #A 302a. Multi-DCI operation, such as that shown in FIG. 3B, can be employed with the assumption of the non-ideal backhaul. With multi-DCI operation, each TRP may use a single PDCCH to schedule the corresponding PDSCH transmission. This is shown in FIG. 3B as PDSCH #1 from TRP #A 302a scheduling PDCCH #1 from TRP #A 302a and PDSCH #2 from TRP #B 302b scheduling PDCCH #2 from TRP #B 302b.

With multi-DCI multi-TRP operation, multiple control resource set (CORESET) pools may be present. Each CORESET is a set of physical resources and a set of parameters that is used to carry PDCCH/DCI. One CORESET may be configured with a parameter CORESETPoolIndex, which can differentiate TRPs. For example, the value of 0 for CORESETPoolIndex corresponds to TRP #A, and the value of 1 corresponds to TRP #B.

Figure 4:
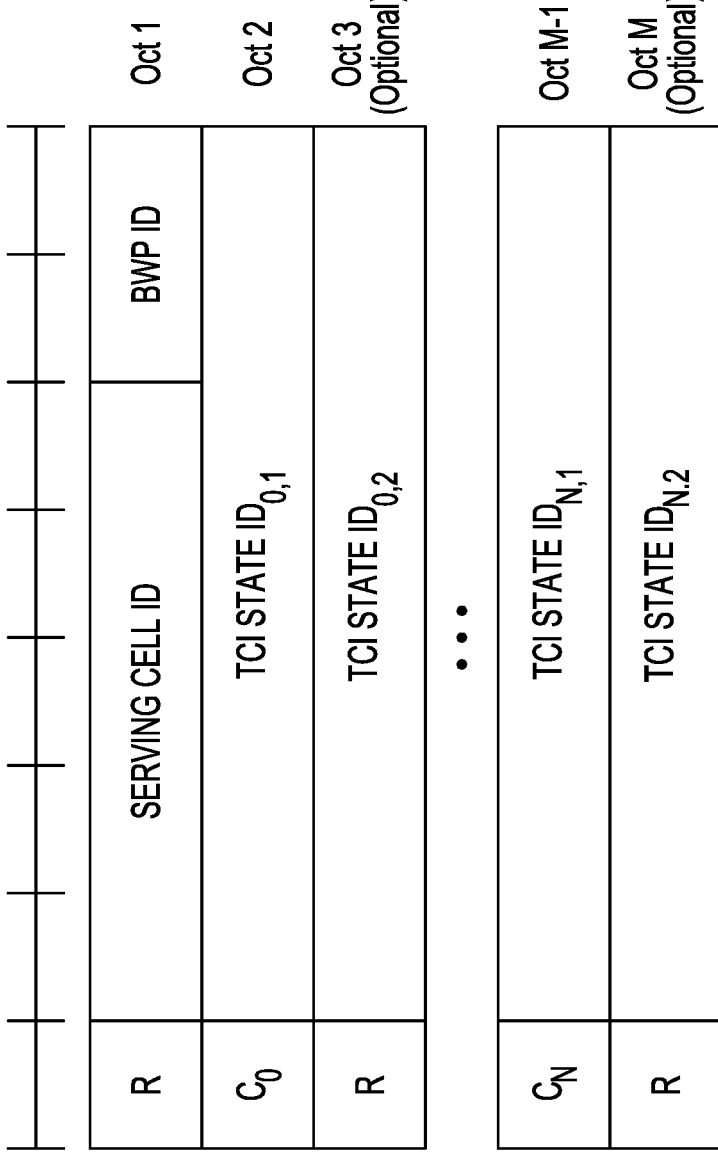
FIG. 4 illustrates a medium access control (MAC) control element (MAC-CE) in accordance with some embodiments.

With single DCI multi-TRP operation, the code point of the Transmission Configuration Indication (TCI) field in DCI can be associated with one or two TCI states. FIG. 4 shows a MAC-CE in accordance with some embodiments. The MAC-CE may be used configure the TCI code point with multiple TCI states. The fields of the MAC-CE are defined as below:

Serving Cell ID: This field indicates the identity of the Serving Cell for which the MAC CE applies. The length of the field is 5 bits.

Bandwidth Part Indicator (BWP) ID: This field indicates a DL BWP for which the MAC CE applies as the codepoint of the DCI bandwidth part indicator field as specified in TS 38.212. The length of the BWP ID field is 2 bits.

$C_i$: This field indicates whether the octet containing TCI state $ID_{i,2}$ is present. If this field is set to "1", the octet containing TCI state $ID_{i,2}$ is present. If this field is set to "0", the octet containing TCI state $ID_{i,2}$ is not present.

TCI state $ID_{i,j}$: This field indicates the TCI state identified by TCI-StateId as specified in TS 38.331, where i is the index of the codepoint of the DCI Transmission configuration indication field as specified in TS 38.212 and TCI state $ID_{i,j}$ denotes the $j^{th}$ TCI state indicated for the $i^{th}$ codepoint in the DCI Transmission Configuration Indication field. The TCI codepoint to which the TCI States are mapped is determined by its ordinal position among all the TCI codepoints with sets of TCI state $ID_{i,j}$ fields, i.e. the first TCI codepoint with TCI state $ID_{0,1}$ and TCI state $ID_{0,2}$ is mapped to the codepoint value 0, the second TCI codepoint with TCI state $ID_{1,1}$ and TCI state $ID_{1,2}$ is mapped to the codepoint value 1 and so on. The TCI state $ID_{1,2}$ is optional based on the indication of the $C_i$ field. The maximum number of activated TCI codepoint is 8 and the maximum number of TCI states mapped to a TCI codepoint is 2.

R: Reserved bit, set to "0".

In NR Rel-15, the MAC-CE is defined to update the spatial relation for semi-persistent SRS. In Rel-16, another MAC-CE is defined to update the spatial relation for aperiodic SRS. FIG. 5 illustrates a MAC-CE to update spatial relation for semi-persistent SRS in accordance with some embodiments. The MAC-CE in FIG. 5 is for semi-persistent (SP) SRS activation/deactivation. The fields of the MAC-CE in FIG. 5 are defined as below:

A/D: This field indicates whether to activate or deactivate the indicated SP SRS resource set. The field is set to 1 to indicate activation, otherwise it indicates deactivation.

SRS Resource Set's Cell ID: This field indicates the identity of the Serving Cell, which contains activated/deactivated SP SRS Resource Set. If the C field is set to 0, this field also indicates the identity of the Serving Cell which contains all resources indicated by the Resource $ID_i$ fields. The length of the field is 5 bits.

SRS Resource Set's BWP ID: This field indicates a UL BWP as the codepoint of the DCI bandwidth part indicator field as specified in TS 38.212, which contains the activated/deactivated SP SRS Resource Set. If the C field is set to 0, this field also indicates the identity of the BWP that contains all resources indicated by the Resource $ID_i$ fields. The length of the field is 2 bits.

C: This field indicates whether the octets containing the Resource Serving Cell ID field(s) and Resource BWP ID field(s) are present. If this field is set to 1, the octets containing the Resource Serving Cell ID field(s) and Resource BWP ID field(s) are present, otherwise they are not present.

Supplementary Uplink (SUL): This field indicates whether the MAC CE applies to the normal uplink (NUL) carrier or SUL carrier configuration. This field is set to 1 to indicate that it applies to the SUL carrier configuration, and it is set to 0 to indicate that it applies to the NUL carrier configuration.

SP SRS Resource Set ID: This field indicates the SP SRS Resource Set ID identified by SRS-ResourceSetId as specified in TS 38.331, which is to be activated or deactivated. The length of the field is 4 bits.

$F_i$: This field indicates the type of a resource used as a spatial relationship for SRS resource within SP SRS Resource Set indicated with SP SRS Resource Set ID field. $F_0$ refers to the first SRS resource within the resource set, $F_1$ to the second one and so on. The field is set to 1 to indicate the non-zero power (NZP) Channel Status Information (CSI)-RS resource index is used, and it is set to 0 to indicate either the synchronization signal block (SSB) index or SRS resource index is used. The length of the field is 1 bit. This field is only present if MAC CE is used for activation, i.e. the A/D field is set to 1.

Resource $ID_i$: This field contains an identifier of the resource used for spatial relationship derivation for SRS resource i. Resource $ID_0$ refers to the first SRS resource within the resource set, Resource $ID_1$ to the second one and so on. If $F_i$ is set to 0, and the first bit of this field is set to 1, the remainder of this field contains the SSB-Index as specified in TS 38.331. If $F_i$ is set to 0, and the first bit of this field is set to 0, the remainder of this field contains the SRS-ResourceId as specified in TS 38.331. The length of the field is 7 bits. This field is only present if MAC CE is used for activation, i.e., the A/D field is set to 1.

Resource Serving Cell $ID_i$: This field indicates the identity of the Serving Cell on which the resource used for the spatial relationship derivation where the SRS resource i is located. The length of the field is 5 bits.

Resource BWP $ID_i$: This field indicates a UL BWP as the codepoint of the DCI bandwidth part indicator field as specified in TS 38.212, on which the resource used for the spatial relationship derivation where SRS resource i is located. The length of the field is 2 bits.

R: Reserved bit, set to 0.

FIG. 6 illustrates a MAC-CE to update spatial relation for aperiodic SRS in accordance with some embodiments. The fields of the MAC-CE are defined as below:

SRS Resource Set's Cell ID: This field indicates the identity of the Serving Cell, which contains the indicated access point (AP) SRS Resource Set. If the C field is set to 0, this field also indicates the identity of the Serving Cell which contains all resources indicated by the Resource $ID_i$ fields. The length of the field is 5 bits.

SRS Resource Set's BWP ID: This field indicates a UL BWP as the codepoint of the DCI bandwidth part indicator field as specified in TS 38.212, which contains the indicated AP SRS Resource Set. If the C field is set to 0, this field also indicates the identity of the BWP that contains all resources indicated by the Resource $ID_i$ fields. The length of the field is 2 bits.

C: This field indicates whether the octets containing the Resource Serving Cell ID field(s) and Resource BWP ID field(s) are present. If this field is set to 1, the octets containing the Resource Serving Cell ID field(s) and Resource BWP ID field(s) are present, otherwise they are not present.

SUL: This field indicates whether the MAC CE applies to the NUL carrier or SUL carrier configuration. This field is set to 1 to indicate that it applies to the SUL carrier configuration, and it is set to 0 to indicate that it applies to the NUL carrier configuration.

AP SRS Resource Set ID: This field indicates the AP SRS Resource Set ID identified by the SRS-ResourceSetId as specified in TS 38.331. The length of the field is 4 bits.

$F_i$: This field indicates the type of a resource used as a spatial relationship for SRS resource within the AP SRS Resource Set indicated with AP SRS Resource Set ID field. $F_0$ refers to the first SRS resource within the resource set, $F_1$ to the second one and so on. The field is set to 1 to indicate the NZP CSI-RS resource index is used, and it is set to 0 to indicate either the SSB index or SRS resource index is used. The length of the field is 1 bit. This field is only present if MAC CE is used for activation, i.e. the A/D field is set to 1.

Resource $ID_i$: This field contains an identifier of the resource used for spatial relationship derivation for SRS resource i. Resource $ID_0$ refers to the first SRS resource within the resource set, Resource $ID_i$ to the second one and so on. If $F_i$ is set to 0, and the first bit of this field is set to 1, the remainder of this field contains SSB-Index as specified in TS 38.331. If $F_i$ is set to 0, and the first bit of this field is set to 0, the remainder of this field contains the SRS-ResourceId as specified in TS 38.331. The length of the field is 7 bits.

Resource Serving Cell $ID_i$: This field indicates the identity of the Serving Cell on which the resource used for spatial relationship derivation for SRS resource i is located. The length of the field is 5 bits.

Resource BWP $ID_i$: This field indicates a UL BWP as the codepoint of the DCI bandwidth part indicator field as specified in TS 38.212, on which the resource used for spatial relationship derivation for SRS resource i is located. The length of the field is 2 bits.

R: Reserved bit, set to 0.

In NR Rel-16, another MAC-CE is defined to update the spatial relation for PUCCH. The details are found in TS 38.321.

In NR Rel-15, for a PUSCH scheduled by DCI format 0_0, a default spatial relation could be applied. This default spatial relation may be the spatial relation of the PUCCH resource with the lowest resource ID on the component carrier (CC). If the PUCCH resource is not configured on the CC or if the PUCCH resource is configured but without a spatial relation, then the UE is not expected to be scheduled by DCI 0_0.

In NR Rel-16, the default beam operation is defined for SRS, PUCCH, and PUSCH scheduled by DCI 0_0, in order to reduce the overhead. If the default beam is enabled for SRS/PUCCH, then the SRS/PUCCH could be configured without spatial relation information and the MAC-CE to update spatial relation for SRS/PUCCH may not be transmitted so that the overhead of MAC-CE is reduced. If the default beam is enabled for a PUSCH, then the PUSCH could be scheduled by DCI format 0_0 even if the PUCCH resource is not configured on the CC or if the PUCCH resource is configured but without the spatial relation.

If the parameter enableDefaultBeamPlForSRS is set to 'enabled', then the default spatial relation/pathloss reference signal for SRS is: the TCI state/QCL assumption of the CORESET with the lowest ID if the CORESET(s) is configured on the CC; or the activated TCI state with the lowest ID for the PDSCH if no CORESET is configured on the CC.

If the parameter enableDefaultBeamPlForPUCCH is set to 'enabled', then the default spatial relation/pathloss reference signal for the PUCCH is: the TCI state/QCL assumption of the CORESET with the lowest ID if the CORESET(s) is configured on the CC.

If the parameter enableDefaultBeamPlForPUSCH0_0 is set to 'enabled', then the default spatial relation/pathloss reference signal for the PUSCH scheduled by DCI 0_0 is: if no PUCCH resource is configured on the active BWP in the CC, the default spatial relation/pathloss reference signal is the TCI state/QCL assumption of the CORESET with the lowest ID; or if the PUCCH resources are configured but without spatial relation, then the default spatial relation/pathloss reference signal follows the default spatial relation/pathloss reference signal of those PUCCH resources.

However, the existing default spatial relation design for the SRS/PUCCH/PUSCH is applied to single TRP case. In order to support multi-TRP operation, the default spatial relation design is further enhanced.

Default Uplink Spatial Relation in Multi-TRP with Multi-DCI

1. SRS

In an embodiment, in multi-DCI multi-TRP, one SRS resource is associated with one spatial relation. In order to reduce overhead, the default beam/spatial relation could be applied for SRS transmission. The existing parameter, e.g. enableDefaultBeamPlForSRS, can be reused indicating whether default spatial relation/beam for SRS transmission is enabled. If this parameter is enabled, then the spatial relations and pathloss reference signals are not configured for SRS. Thus, further MAC-CE to update the spatial relations for the SRS transmission may be avoided and the overhead could be reduced.

In a multi-DCI multi-TRP, the SRS could be associated with one TRP. The association could be defined at SRS resource level or SRS resource set level by a new RRC parameter associatedCORESETPool-SRS. The parameter associatedCORESETPool-SRS indicates which CORESET pool is associated with the SRS resource/SRS resource set. The value of associatedCORESETPool-SRS may be the same as the CORESETPoolIndex of the CORESET pool. For example, if the SRS is associated with the CORESET pool of CORESETPoolIndex=1, then the value of associatedCORESETPool-SRS may be set to '1'. The association defined by associatedCORESETPool-SRS could be applied for periodic, semi-persistent and aperiodic SRS (in another example, the association between SRS and CORESET pool could be updated by a new MAC-CE). Alternatively, for aperiodic SRS, the association could be implicitly indicated by the scheduling PDCCH. For example, if the aperiodic SRS is triggered by a CORESET that is configured with CORESETPoolIndex #A, then the triggered SRS is associated with CORESETPoolIndex #A. The default spatial relation/default pathloss reference signal for SRS could be determined according to the associated TRP.

Note that the application of association between the SRS and TRP in this embodiment is not limited to default beam operation for SRS. In other embodiments, codebook-based transmission, non-codebook-based transmission, etc. may be used.

An example of a radio resource control (RRC) configuration for SRS with associated CORESET pool is:

```
SRS-ResourceSet ::=              SEQUENCE {
  srs-ResourceSetId          SRS-ResourceSetId,
  srs-ResourceIdList         SEQUENCE (SIZE(1..maxNrofSRS-ResourcesPerSet)) OF SRS-
ResourceId                   OPTIONAL, -- Cond Setup
  ...
  ...
  usage                    ENUMERATED {beamManagement, codebook, nonCodebook,
antennaSwitching},
  associatedCORESETPool-SRS    INTEGER(0...1)                OPTIONAL
  alpha                      Alpha               OPTIONAL, -- Need S
  p0                         INTEGER (–202..24)              OPTIONAL, -- Cond Setup
  pathlossReferenceRS         PathlossReferenceRS-Config      OPTIONAL, -- Need M
  ...
  ...
}
```

Note: the default beam operation is not applicable for SRS transmission for beam management. For SRS with single spatial relations in multi-DCI multi-TRP, if enableDefaultBeamPlForSRS is enabled, and neither the spatial relation nor the pathloss reference signal is configured for SRS, the default spatial relation/pathloss reference signal for SRS is applied and is determined as below:

Alt 1:

The default spatial relation/pathloss reference signal of the SRS follows the TCI state/QCL assumption of the lowest indexed CORESET among those CORESETs, whose configured CORESETPoolindex is the same as the CORESET pool associated with the SRS, in the latest slot in which one or more CORESETs whose configured CORESETPoolindex is the same as the CORESET pool associated with the SRS are monitored by the UE. The 'latest slot' is prior to the SRS transmission. If there is no SRS transmission at all, i.e. it's just for spatial relation derivation for the PUSCH, then the 'latest slot' is prior to the corresponding PUSCH transmission.

The associated CORESET pool with SRS is indicated by associatedCORESETPool-SRS. Alternatively, the associated CORESET pool is the same as the scheduling CORESET if the SRS is indicated by DCI, i.e. aperiodic SRS. For aperiodic SRS triggered by DCI, alternatively the default spatial relation/pathloss reference signal could follow the TCI state/QCL assumption of the scheduling CORESET.

If no CORESET is configured in the active BWP within the CORESET pool associated with the SRS resource, then the default spatial relation/pathloss reference signal follows the activated TCI state with the lowest ID for PDSCH within the same CORESET pool.

Figure 7:
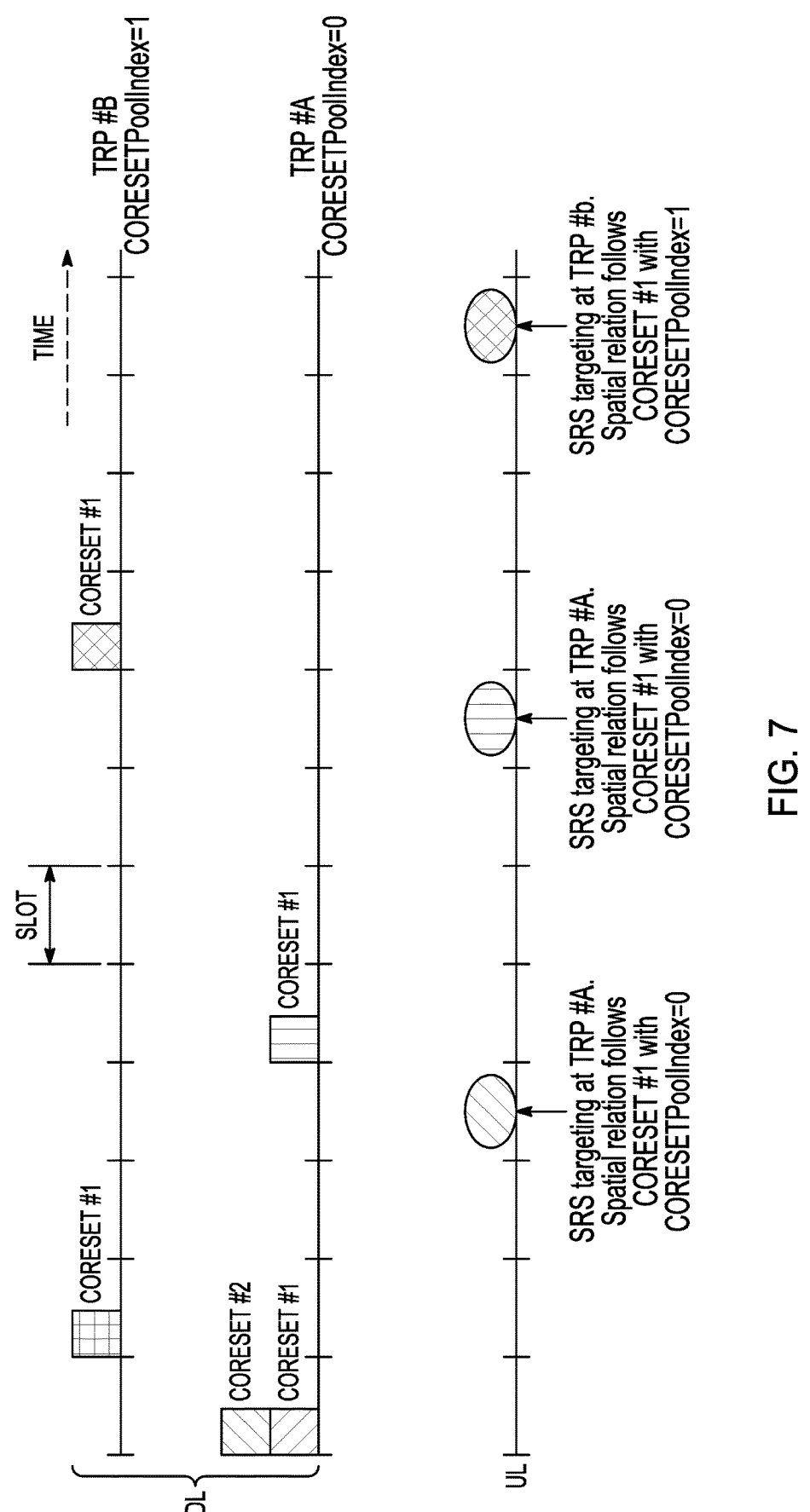
FIG. 7 illustrates a default spatial relation determination for SRS in accordance with some embodiments.

FIG. 7 illustrates a default spatial relation determination for SRS in accordance with some embodiments. As above, the default spatial relation determination for SRS is for a multi-DCI multi-TRP.

PUCCH

In an embodiment, in multi-DCI multi-TRP, one PUCCH resource is associated with only one spatial relation. In order to reduce overhead, the default beam/spatial relation could be applied for PUCCH transmission. The existing parameter, e.g. enableDefaultBeamPlForPUCCH, can be reused indicating whether a default spatial relation/beam for PUCCH transmission is enabled. If this parameter is enabled, then the spatial relations and pathloss reference signals are not con-figured for the PUCCH. Thus, further MAC-CE transmissions to update the spatial relations for PUCCH transmission may be avoided and the overhead could be reduced.

In multi-DCI multi-TRP, the PUCCH may be associated with one TRP. The association may be defined at PUCCH resource set level/PUCCH resource group level/PUCCH resource level by a new RRC parameter associatedCORESETPool-PUCCH. In another example, the associated TRP with PUCCH could be implicitly represented by the PUCCH resource group ID or the PUCCH resource set ID. The parameter associatedCORESETPool-PUCCH indicates which CORESET pool is associated with the PUCCH resource/PUCCH resource set/PUCCH resource group. In another example, the association between PUCCH and CORESET pool could be updated by a new MAC-CE. The value of associatedCORESETPool-PUCCH should be the same as the CORESETPoolIndex of the CORESET pool. For example, if the PUCCH is associated with the CORESET pool of CORESETPoolIndex=1, then the value of associatedCORESETPool-PUCCH should be set to '1'. Alternatively, if the PUCCH resource is indicated by DCI, then the PUCCH resource could be implicitly associated with the CORESET pool of the scheduling CORESET. The default spatial relation/default pathloss reference signal for the PUCCH could be determined according to the associated TRP.

Note that the application of association between PUCCH and TRP in this embodiment is not limited to default beam operation for PUCCH. An example of the RRC configuration for PUCCH with associated CORESET pool is:

```
PUCCH-Resource ::=                    SEQUENCE {
  pucch-ResourceId                      PUCCH-ResourceId,
  associatedCORESETPool-PUCCH             INTEGER(0...1)            OPTIONAL
  startingPRB                           PRB-Id,
  intraSlotFrequencyHopping               ENUMERATED { enabled }   OPTIONAL, -- Need R
  secondHopPRB                          PRB-Id                     OPTIONAL, -- Need R
  format                                CHOICE {
    format0                               PUCCH-format0,
    format1                               PUCCH-format1,
    format2                               PUCCH-format2,
    format3                               PUCCH-format3,
    format4                               PUCCH-format4
  }
}
```

For a PUCCH with single spatial relations in multi-DCI multi-TRP, if enableDefaultBeamPlForPUCCH is enabled, and neither the spatial relation nor the pathloss reference signal is configured for PUCCH, the default spatial relation/pathloss reference signal for PUCCH is applied and is determined as below:

Alt 1:

The default spatial relation/pathloss reference signal of the PUCCH may follow the TCI state/QCL assumption of the lowest indexed CORESET among those CORESETs, whose configured CORESETPoolindex is the same as the CORESET pool associated with the PUCCH, in the latest slot in which one or more CORESETs whose configured CORESETPoolindex is the same as the CORESET pool associated with the PUCCH are monitored by the UE. The 'latest slot' is prior to the PUCCH transmission. The associated CORESET pool with the PUCCH is indicated by associatedCORESETPool-PUCCH. Alternatively, the associated CORESET pool is the same as the scheduling CORESET if the PUCCH is indicated by the DCI.

For a PUCCH indicated by DCI, alternatively the default spatial relation/pathloss reference signal may follow the TCI state/QCL assumption of the scheduling CORESET.

If no CORESET is configured in the active BWP within the CORESET pool associated with the PUCCH resource, then the default spatial relation/pathloss reference signal follows the activated TCI state with the lowest ID for the PDSCH within the same CORESET pool.

Figure 8:
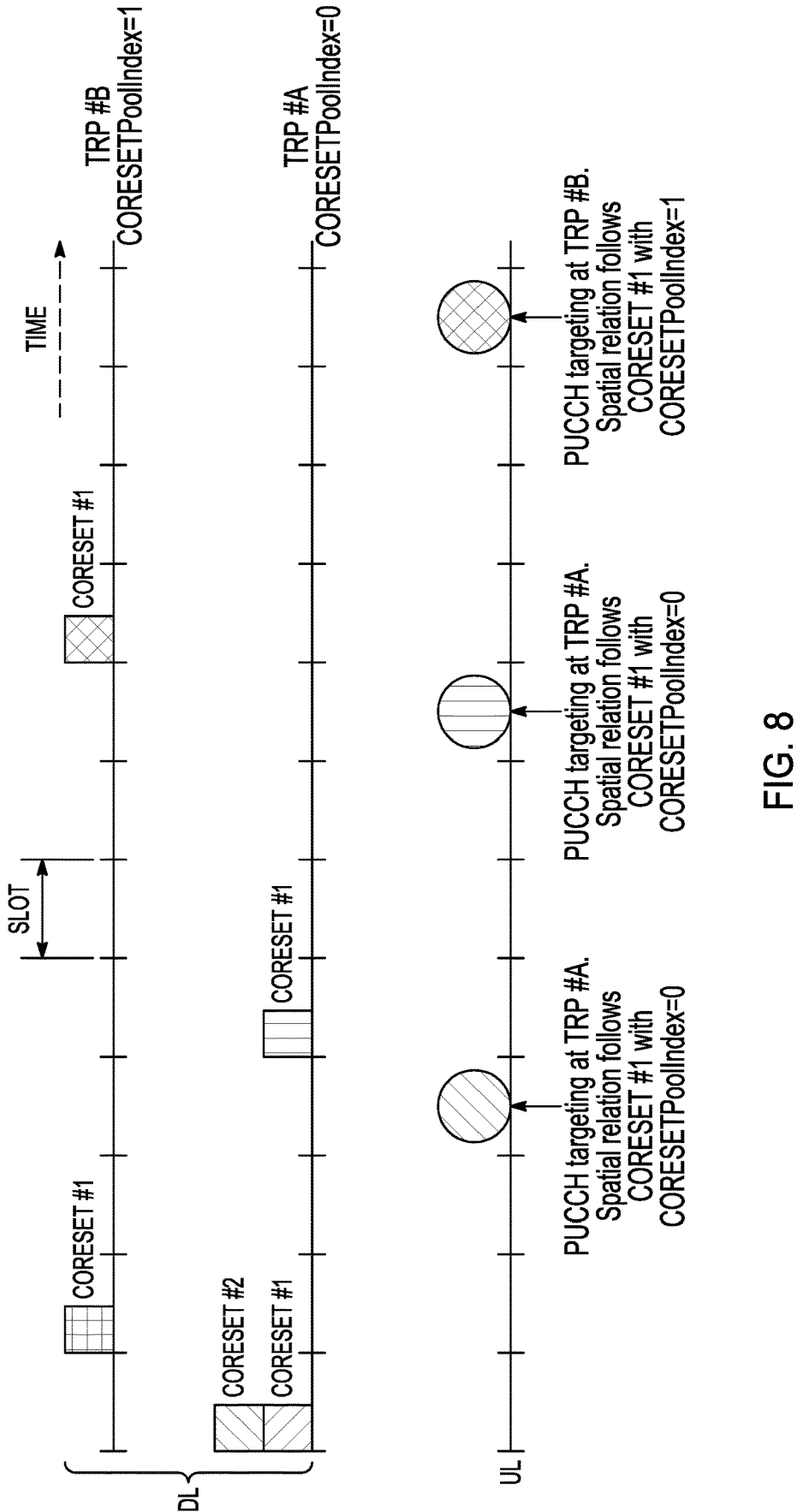
FIG. 8 illustrates a default spatial relation determination for a physical uplink control channel (PUCCH) in accordance with some embodiments.

FIG. 8 illustrates a default spatial relation determination for a PUCCH in accordance with some embodiments. As above, the default spatial relation determination for the PUCCH is for a multi-DCI multi-TRP.

PUSCH

In an embodiment, in multi-DCI multi-TRP, if the parameter enableDefaultBeamPlForPUSCH0_0 is set to 'disabled', the UE is not expected to be scheduled by DCI format 00 from one TRP (indicated by CORESETPoolIndex) over which there is no PUCCH resources configured with spatial relation. If there is at least one PUCCH resource configured with spatial relation over the TRP, then the spatial relation/pathloss reference signal for PUSCH scheduled by DCI format 0_0 should follow the spatial relation of the PUCCH resource with the lowest resource ID over the TRP (indicated by CORESETPoolIndex and associated-CORESETPool-PUCCH).

Alternatively, in multi-DCI multi-TRP, if the parameter enableDefaultBeamPlForPUSCH0_0 is set to 'disabled', no matter whether there is configured PUCCH resource over the scheduling TRP or not, and no matter whether the PUCCH resource is configured with or without spatial relation, the default spatial relation/pathloss reference signal for the PUSCH scheduled by DCI format 0_0 should be determined as below:

Alt 1: the default spatial relation/pathloss reference signal of the PUSCH scheduled by DCI 0_0 should follow the TCI state/QCL assumption of the CORESET with the lowest ID within the CORESET pool which is the same with the CORESET pool of the scheduling CORESET in the latest slot prior to the PUSCH transmission in which such a CORESET is monitored.

Alt 2: the default spatial relation/pathloss reference signal of the PUSCH scheduled by DCI 0_0 should follow the TCI state/QCL assumption of the scheduling CORESET.

Alt 3: if no PUCCH resource is configured on the TRP sending the scheduling CORESET, the default spatial relation/pathloss reference signal should follow the TCI state/QCL assumption of the CORESET with the lowest ID within the CORESET pool which is the same with the CORESET pool of the scheduling CORESET in the latest slot prior to the PUSCH transmission in which such a CORESET is monitored. If PUCCH resources are configured but without spatial relation on the TRP sending the scheduling CORESET, then the default spatial relation/pathloss reference signal follow the default spatial relation/pathloss reference signal of those PUCCH resources on the TRP sending the scheduling CORESET.

Figure 9:
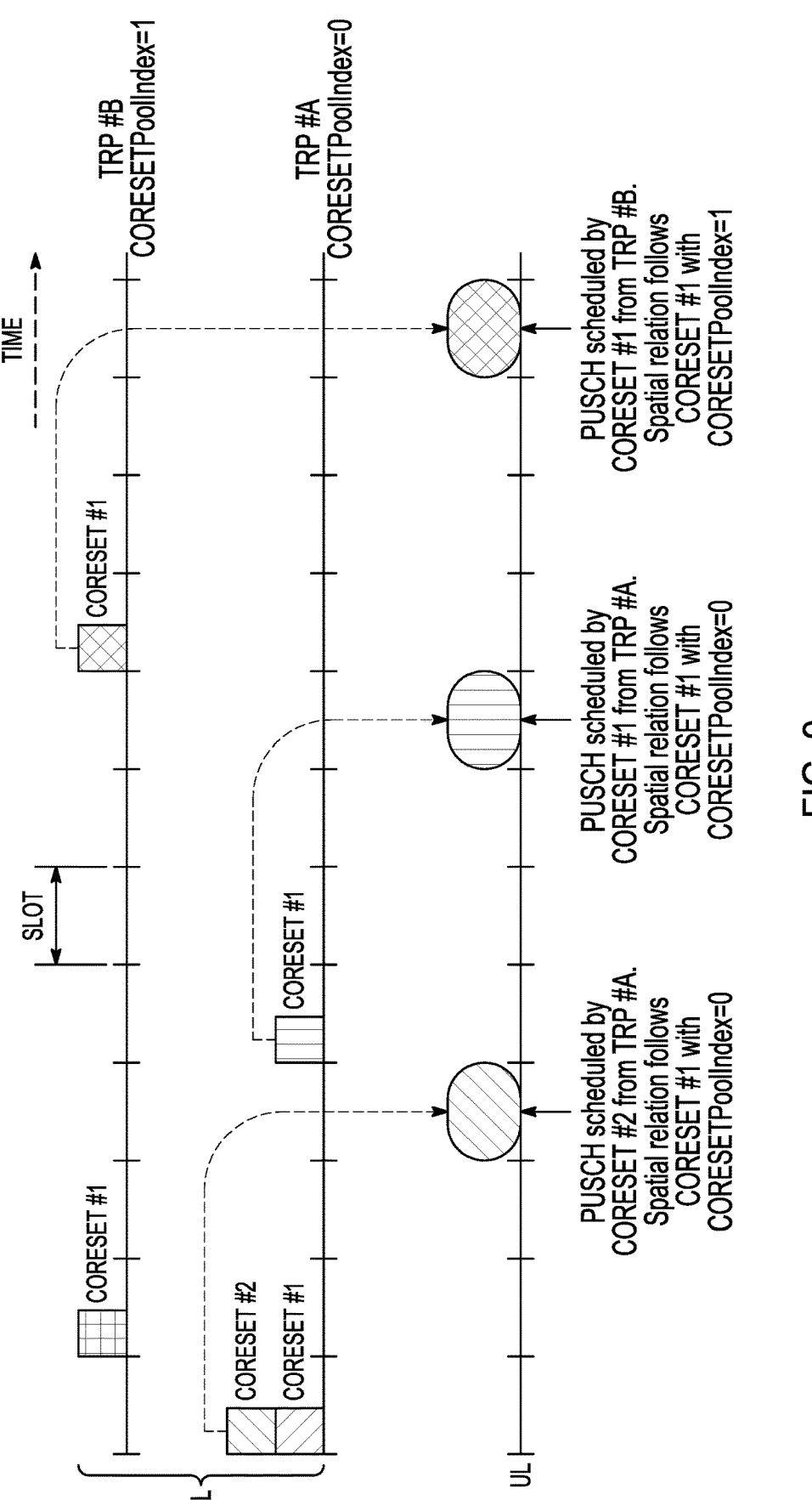
FIG. 9 illustrates a default spatial relation determination for a physical uplink shared channel (PUSCH) in accordance with some embodiments.

FIG. 9 illustrates a default spatial relation determination for a PUSCH in accordance with some embodiments. As above, the default spatial relation determination for a PUSCH scheduled by DCI 0_0 is for a multi-DCI multi-TRP.

In another embodiment, for a PUSCH scheduled by a DCI format other than 0_0, the spatial relation of the PUSCH should follow the spatial relation of the SRS resource indicated by the SRS resource index (SRI) or the SRS resource configured by RRC if only one SRS resource is configured. If the parameter enableDefaultBeamPlForSRS is set to 'enabled', then the PUSCH transmission should follow the default spatial relation of the corresponding SRS resource. If there is no SRS transmission, then the default SRS spatial relation should be derived assuming the SRS would be transmitted in the first slot of the PUSCH transmission.

In another embodiment, for a PUSCH scheduled by all the DCI formats, the default beam operation could be enabled. A new parameter enableDefaultBeamPlForPUSCH could be introduced. If it is set to 'enabled', the default spatial relation for PUSCH transmission could be determined as below:

Alt 1: the default spatial relation/pathloss reference signal of the PUSCH should follow the spatial relation of the SRS resource indicated by the SRI or the SRS resource configured by the RRC if only one SRS resource is configured.

Alt 2: the default spatial relation/pathloss reference signal of the PUSCH should follow the spatial relation of the PUCCH resource with the lowest ID that is associated with the same CORESET pool as the scheduling CORESET.

Alt 3: the default spatial relation/pathloss reference signal of the PUSCH should follow the TCI state/QCL assumption of the CORESET with the lowest ID within the CORESET pool that is the same with the CORESET pool of the scheduling CORESET in the latest slot prior to the PUSCH transmission in which such a CORESET is monitored.

Alt 4: the default spatial relation/pathloss reference signal of the PUSCH should follow the TCI state/QCL assumption of the scheduling CORESET.

As indicated above, in the Rel-15 specification, different types of SRS resource sets are supported. The SRS resource set is configured with a parameter of 'usage', which can be set to 'beamManagement', 'codebook', 'nonCodebook' or 'antennaSwitching'. The SRS resource set configured for 'beamManagement' is used for beam acquisition and uplink beam indication using SRS. The SRS resource set configured for 'codebook' and 'nonCodebook' is used to determine the UL precoding with an explicit indication by Transmission Precoding Matrix Indicator (TPMI) or implicit indication by SRI. Finally, the SRS resource set configured for 'antennaSwitching' is used to acquire DL channel state information using SRS measurements in the UE by leveraging reciprocity of the channel in TDD systems. For SRS transmission, the time domain behavior could be periodic, semi-persistent or aperiodic. The RRC configuration for SRS resource set is:

```
SRS-ResourceSet ::=             SEQUENCE {
  srs-ResourceSetId               SRS-ResourceSetId,
  srs-ResourceIdList              SEQUENCE (SIZE(1..maxNrofSRS-ResourcesPerSet)) OF SRS-Re-    OPTIONAL, -- Cond Setup
                                  sourceID
  resourceType                    CHOICE {
    aperiodic                       SEQUENCE {
      aperiodicSRS-ResourceTrigger    INTEGER (1..maxNrofSRS-TriggerStates-1),
      csi-RS                          NZP-CSI-RS-ResourceId                                    OPTIONAL, -- Cond NonCodebook
      slotOffset                      INTEGER (1..32)                                          OPTIONAL, -- Need S
      ...
      [[
      aperiodicSRS-ResourceTriggerList-v1530  SEQUENCE (SIZE(1..maxNrofSRS-TriggerStates-2))
                                                OF INTEGER (1..maxNrofSRS-TriggerStates-1)      Optional -- Need M
      ]]
    },
    semi-persistent                 SEQUENCE {
      associated-RS                   NZP-RS-ResourceId                                        OPTIONAL, -- Cond NonCodebook
      ...
    },
    periodic                        SEQUENCE {
      associated-RS                   NZP-RS-ResourceId                                        OPTIONAL, -- Cond NonCodebook
      ...
    }
  },
  usage                           ENUMERATED {beamManagement, codebook, nonCodebook, antennaSwitching},
  alpha                           Alpha                                                        OPTIONAL, -- Need S
  p0                              INTEGER (-202..24)                                           OPTIONAL, -- Cond Setup
  pathlossReferenceRS             CHOICE {
    ssb-Index                       SIB-Index,
    csi-RS-Index                    NZP-CSI-RS-ResourceId
  }                                                                                            OPTIONAL, -- Need M
  srs-PowerControlAdjustmentStates  ENUMERATED { sameAsFci2, separateClosedLoop}              OPTIONAL, -- Need S
  ...
```

The RRC configuration for SRS resource set is SRS resource is:

it is desirable to reduce the collision, or rules defined to handle a collision if it happens.

```
SRS-Resource ::=              SEQUENCE {
  srs-ResourceId                SRS-ResourceID,
  nrofSRS-Ports                 ENUMERATED {port1, ports2, ports4},
  ptrs-PortIndex                ENUMERATED {n0, n1 }         OPTIONAL -- Need R,
  transmissionComb              CHOICE {
    n2                            SEQUENCE {
      combOffset-n2                 INTEGER (0..1),
      cyclicShift-n2                INTEGER (0..7)
    },
    n4                            SEQUENCE {
      combOffset-n4                 INTEGER (0..3),
      cyclicShift-n4                INTEGER (0..11)
    }
  },
  resourceMapping               SEQUENCE {
    startPosition                 INTEGER (0..5),
    nrofSymbols                   ENUMERATED {n1, n2, n4},
    repetitionFactor              ENUMERATED {n1, n2, n4}
  },
  freqDomainPosition            INTEGER (0..67),
  freqDomainShift               INTEGER (0..268),
  freqHopping                   SEQUENCE {
    c-SRS                         INTEGER (0..63),
    b-SRS                         INTEGER (0..3),
    b-hop                         INTEGER (0..3)
  },
  groupOrSequenceHopping        ENUMERATED { neither, groupHopping, sequenceHopping },
  resourceType                  CHOICE {
    aperiodic                     SEQUENCE {
      ...
    },
    semi-persistent               SEQUENCE {
      periodicityAndOffset-sp         SRS-PeriodicityAndOffset,
      ...
    },
    periodic                      SEQUENCE {
      periodicityAndOffset-p          SRS-PeriodicityAndOffset,
      ...
    }
  },
  sequenceId                    INTEGER (0..1023),
  spatialRelationInfo           SRS-SpatialRelationInfo      OPTIONAL, -- Need R
  ...
}
```

When the SRS resource set is configured as 'aperiodic', the SRS resource set also includes configuration of slot offset (slotOffset) and trigger state(s) (aperiodicSRS-ResourceTrigger, aperiodicSRS-ResourceTriggerList). The parameter of slotOffset defines the slot offset relative to PDCCH where SRS transmission should be commenced. The triggering state(s) defines which DCI codepoint(s) triggers the corresponding SRS resource set transmission.

The slot offset is defined at the SRS resource set level, i.e. the slot offset is common for all SRS resources in the SRS resource set. When aperiodic SRS is triggered, the UE should send aperiodic SRS after receiving a DCI according to the slotOffset defined by RRC.

However, in the scenario of multi-DCI multi-TRP operation, there might be some issue with the SRS configuration and transmission. For example, there might be collision if both TRPs trigger the same SRS resource set/different SRS resource sets to be transmitted in the same slot. Therefore,

Scenario A: SRS Transmission in Multi-DCI Multi-TRP

SRS Triggering and Configuration

Figure 10:
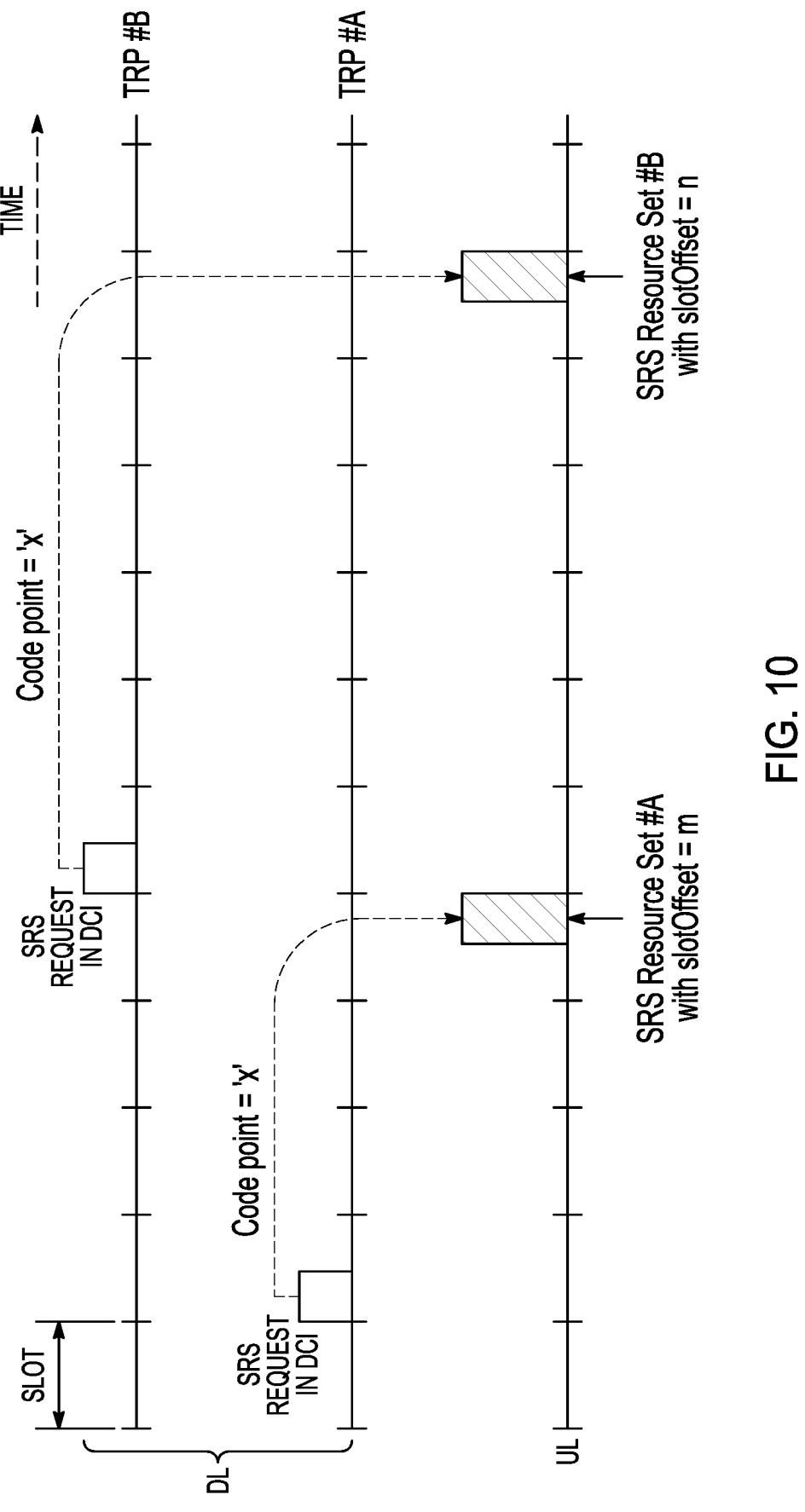
FIG. 10 illustrates TRP-specific SRS triggering in accordance with some embodiments.
Figure 11:
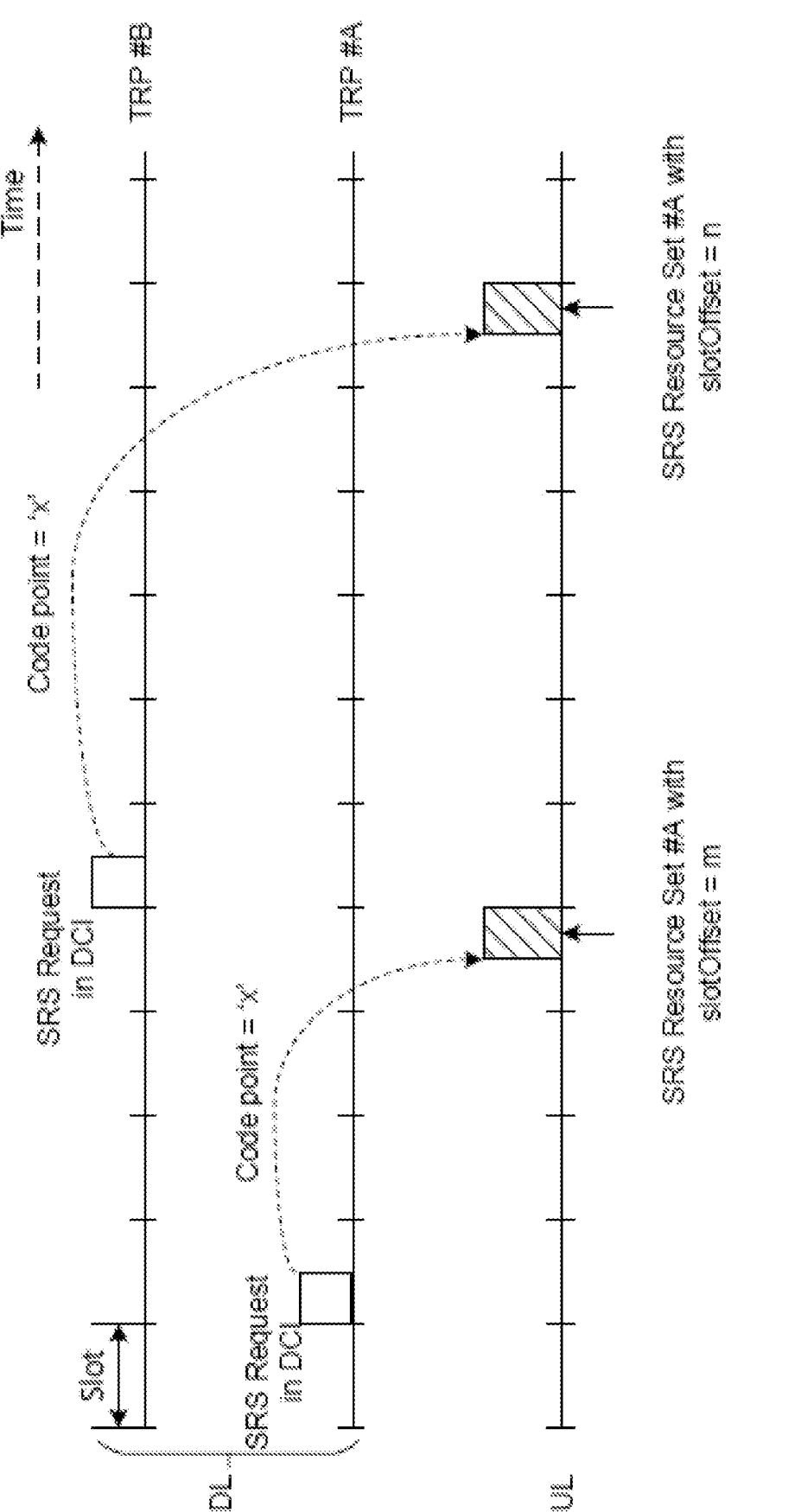
FIG. 11 illustrates TRP-specific SRS triggering with different slot offsets in accordance with some embodiments.

In an embodiment, for SRS triggering in multi-DCI multi-TRP, the SRS trigger state indicated by the code point of the SRS Request field in the DCI could be TRP-specific. The same code point of the SRS Request field may be used to trigger different SRS resource sets by different TRPs. FIG. 10 illustrates TRP-specific SRS triggering in accordance with some embodiments.

In another embodiment, for SRS triggering in multi-DCI multi-TRP, the same code point of the SRS Request field in DCI from different TRPs could trigger the same SRS resource set but with different slot offsets. FIG. 10 illustrates TRP-specific SRS triggering in accordance with some embodiments.

In another embodiment, for multi-DCI multi-TRP, multiple SRS resource sets could be configured for the same usage (codebook-based transmission, non-codebook-based transmission, antenna switching and beam management). The multiple SRS resource sets with the same usage could be configured with the same/different trigger state, and the same/different slotOffset.

Figure 12:
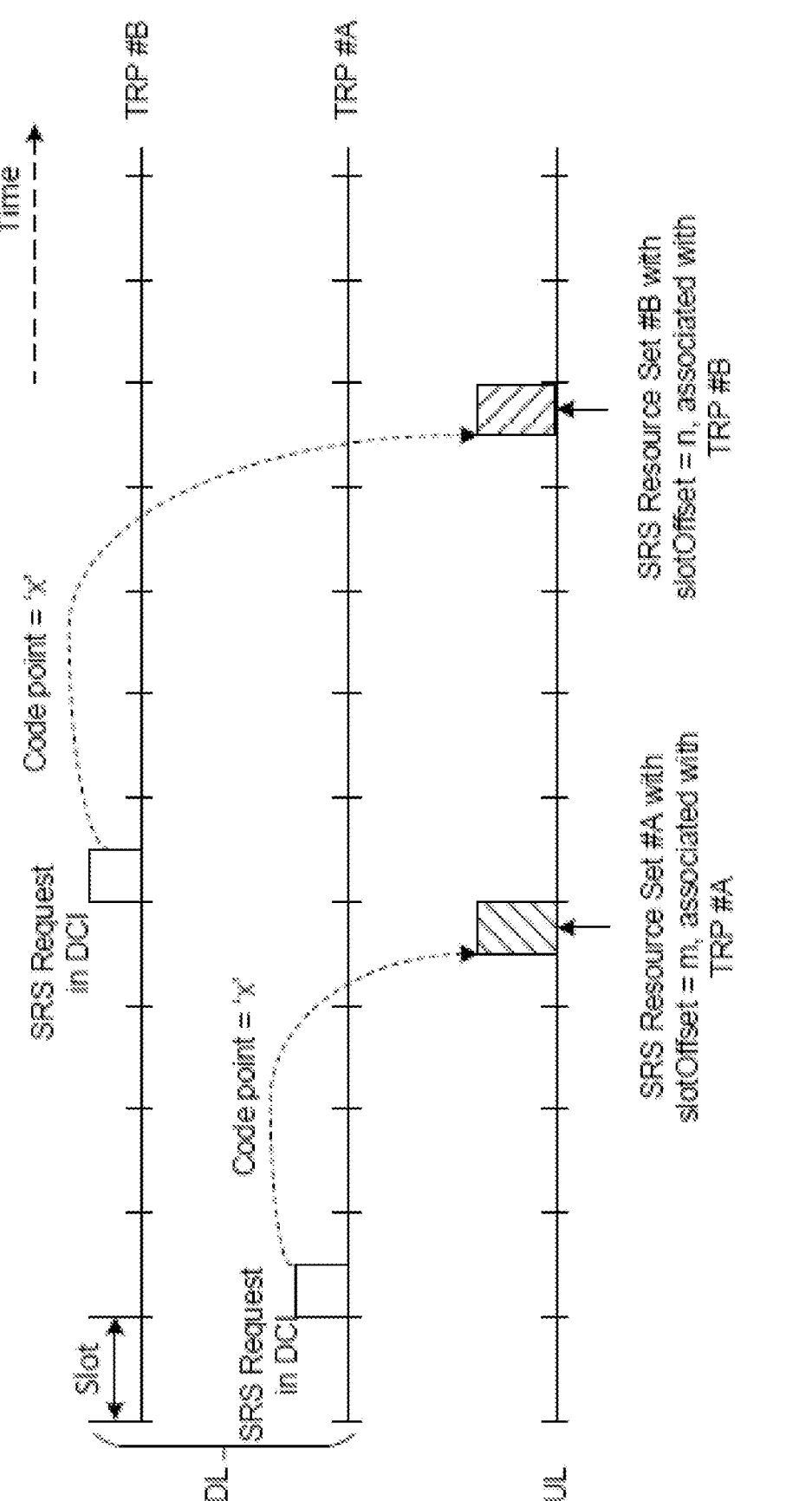
FIG. 12 illustrates TRP-specific SRS triggering with the same usage in accordance with some embodiments.

The SRS could be associated with different TRPs, e.g. different CORESETPoolIndex. The association between the SRS and TRP could be defined at the SRS resource set level/SRS resource level or in the SRS spatial relation info, by a new RRC parameter, for example, associatedCORE-SETPool-SRS. The SRS resource sets with the same usage setting should be associated with different TRPs. For example, in the multi-TRP operation with two TRPs, two SRS resource sets could be defined for codebook-based transmission, and each SRS resource set is associated with one TRP. When sending an SRS Request in the DCI from one TRP, only the SRS resource set associated with the TRP may be triggered. FIG. 12 illustrates TRP-specific SRS triggering with the same usage in accordance with some embodiments.

For codebook-based transmission, when scheduling a PUSCH transmission, the SRI field indicates one SRS resource in the SRS resource set associated with the scheduling TRP. Alternatively, a new field could be introduced in the DCI to indicate the SRS resource set.

For non-codebook-based transmission, with multiple SRS resource sets, different CSI-RS resource sendings by different TRPs could be associated with different SRS resource sets. The UE can calculate different precoders for SRS transmission toward different TRPs based on the measurement on CSI-RS. When scheduling a PUSCH transmission, the SRI field indicates one or more SRS resources in the SRS resource set associated with the scheduling TRP. Alternatively, a new field could be introduced in the DCI to indicate the SRS resource set.

Postponed SRS Transmission and Overlapping Handling

In an embodiment, in multi-DCI multi-TRP, the postponed SRS transmission could be applied, e.g. if there is no available uplink resource/slot for the SRS transmission, then the triggered SRS should be postponed until the next available uplink slot. The postponed SRS transmission should be performed independently among TRPs. There should be some coordination among TRPs.

Figure 13:
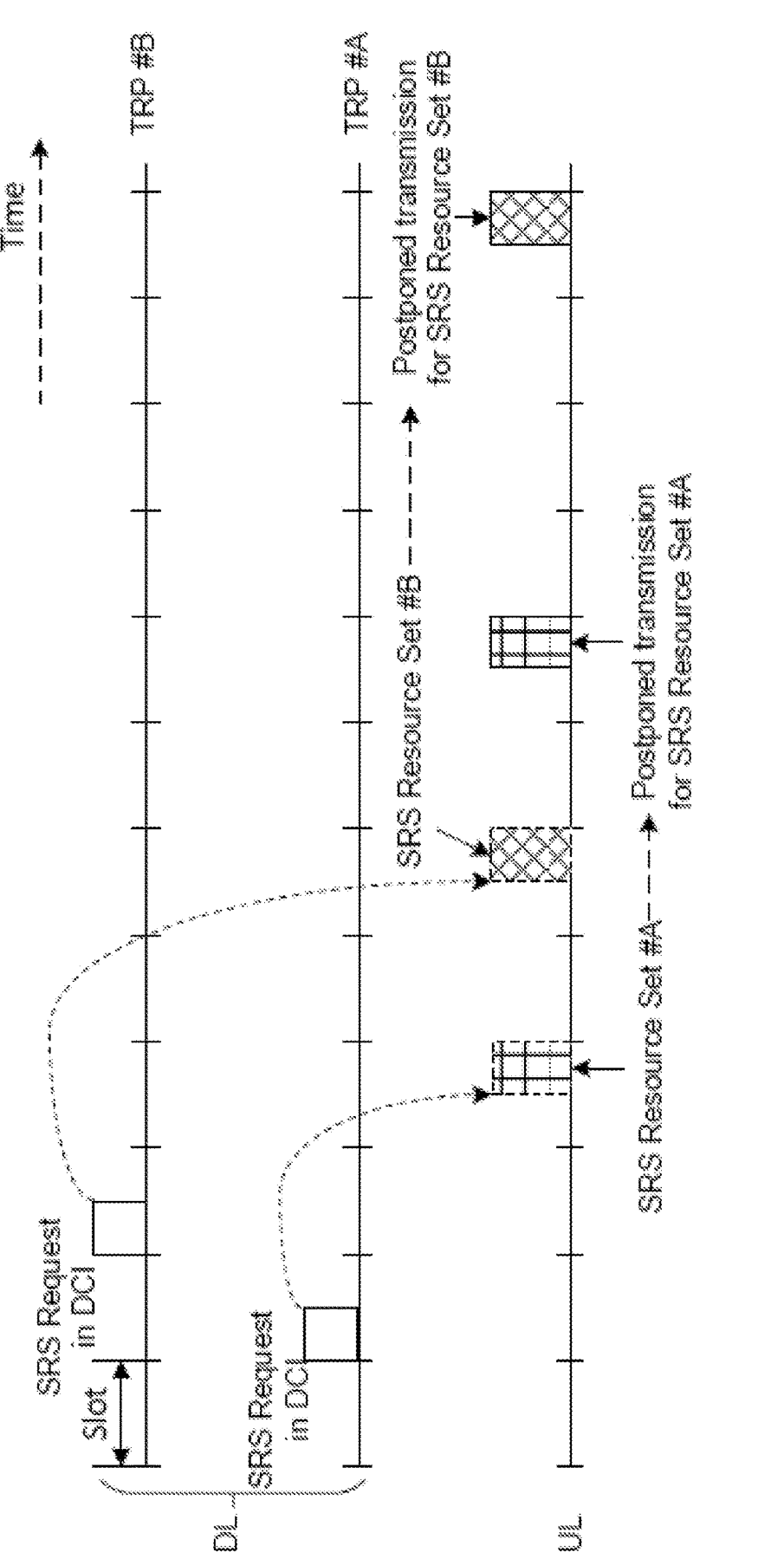
FIG. 13 illustrates independently-postponed SRS transmission in multi-TRP in accordance with some embodiments.

FIG. 13 illustrates independently-postponed SRS transmission in multi-TRP in accordance with some embodiments. In FIG. 13, TRP #A triggers SRS resource set #A with a slot offset of 2 in slot #N, and the SRS resource set #A transmission is postponed to slot #N+6. Between Slot #N and slot #N+6, TRP #B triggers another SRS resource set, SRS resource set #B. In this case, SRS resource set #B is not transmitted in slot #N+6 and is further postponed to next available uplink slot, slot #N+10.

In another example, assuming the available uplink slot for SRS transmission is slot M, a window may be defined for the postponed transmission, for example, X slots. During the period from slot M-X to slot M, if the first triggered SRS is from TRP #A, then slot M should be used to transmit the SRS triggered by TRP #A. The SRS triggered by another TRP, TRP #B, during the period from slot M-X to slot M may be further postponed after slot M. Furthermore, if multiple SRS are triggered by TRP #A during slot M-X to slot M, then the most recent SRS triggered by TRP #A during slot M-X to slot M may be transmitted in slot M.

In another embodiment, in multi-DCI multi-TRP, collisions may occur for the SRS triggered by different TRPs in the following examples: multiple TRPs trigger the same SRS resource set to be transmitted in the same slot, multiple TRPs trigger different SRS resource sets to be transmitted in the same slot, and the SRS resource sets triggered by different TRPs are postponed to the same slot.

In this case, a dropping rule may be provided to handle the overlapping. In one example, if collision happens, one of the following options may be applied to determine which SRS should be sent: the SRS triggered by the TRP with the lowest or the highest TRP ID (CORESETPoolIndex) is to be transmitted and others dropped; the SRS with the lowest or the highest SRS Resource Set ID should be transmitted and others should be dropped; the SRS with certain usage should be transmitted—in this case there is a priority for SRS usage, for example, codebook/non-codebook-based transmission may be prioritized; the most recent triggered SRS may be sent and others may be dropped; or assuming the available uplink slot for SRS transmission is slot M, a window may be defined, for example, X slots. In the last case, during the period from slot M-X to slot M, if the first triggered SRS is from TRP #A, then slot M may be used to transmit the SRS triggered by TRP #A. Furthermore, if multiple SRS are triggered by TRP #A during slot M-X to slot M, then the most recent SRS triggered by TRP #A during slot M-X to slot M may be transmitted in slot M. Other SRS triggered during slot M-X to slot M may be dropped.

Figure 14:
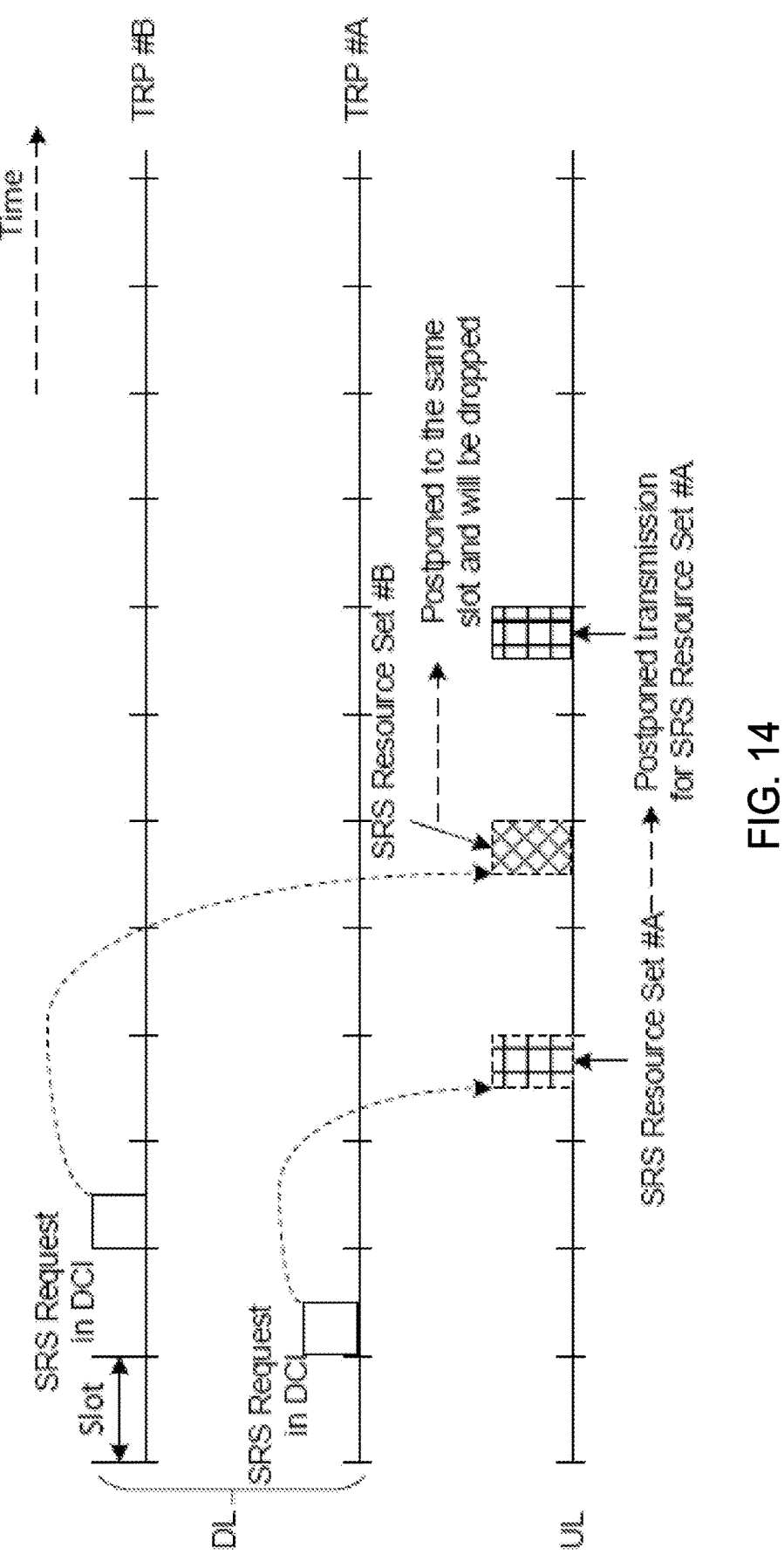
FIG. 14 illustrates collision handling for SRS triggered by multiple TRPs in accordance with some embodiments.

In another example, if collision happens, then the SRS triggered by the TRP whose CORESETPoolIndex equals to (slotNumber mod 2) may be transmitted. FIG. 14 illustrates collision handling for SRS triggered by multiple TRPs in accordance with some embodiments. As shown in FIG. 14, the SRS triggered by the TRP with the lowest TRP ID may be transmitted.

Scenario B: SRS Transmission in Carrier Aggregation

SRS Triggering and Configuration

In an embodiment, for carrier aggregation, multiple SRS resource sets could be configured for the same usage (codebook-based transmission, non-codebook-based transmission, antenna switching and beam management). The multiple SRS resource sets with the same usage may be configured with the same/different trigger state, and the same/different slotOffset.

Figure 15:
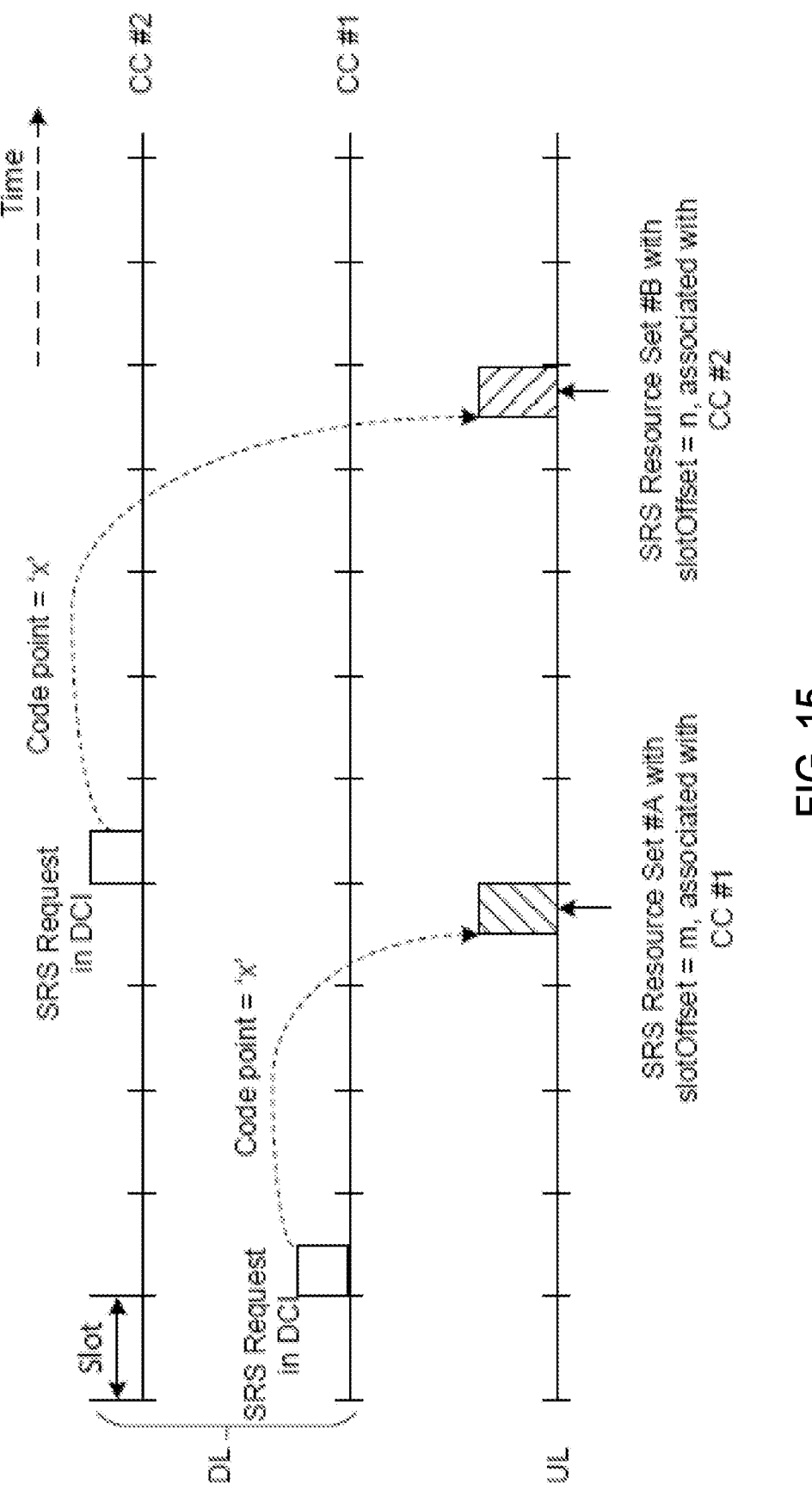
FIG. 15 illustrates multiple SRS resource sets with the same usage in carrier aggregation in accordance with some embodiments.

The SRS may be associated with different CCs. The association between SRS and CC may be defined at the SRS resource set level/SRS resource level or in the SRS spatial relation information, by a new RRC parameter, for example, associated CC-SRS. The SRS resource sets with the same usage setting may be associated with different CCs. When sending an SRS Request in the DCI from one CC, only the SRS resource set associated with the CC may be triggered. FIG. 15 illustrates multiple SRS resource sets with the same usage in carrier aggregation in accordance with some embodiments.

For codebook-based transmission, when scheduling a PUSCH transmission, the SRI field indicates one SRS resource in the SRS resource set associated with the scheduling CC. Alternatively, a new field may be introduced in the DCI to indicate the SRS resource set.

For non-codebook-based transmission, with multiple SRS resource sets, different CSI-RS resource transmissions by different CCs may be associated with different SRS resource sets. The UE can calculate different precoders for SRS transmission based on the measurement on the CSI-RS. When scheduling the PUSCH transmission, the SRI field indicates one or more SRS resources in the SRS resource set associated with the scheduling CC. Alternatively, a new field may be introduced in DCI to indicate the SRS resource set.

Postponed SRS Transmission and Overlapping Handling

Figure 16:
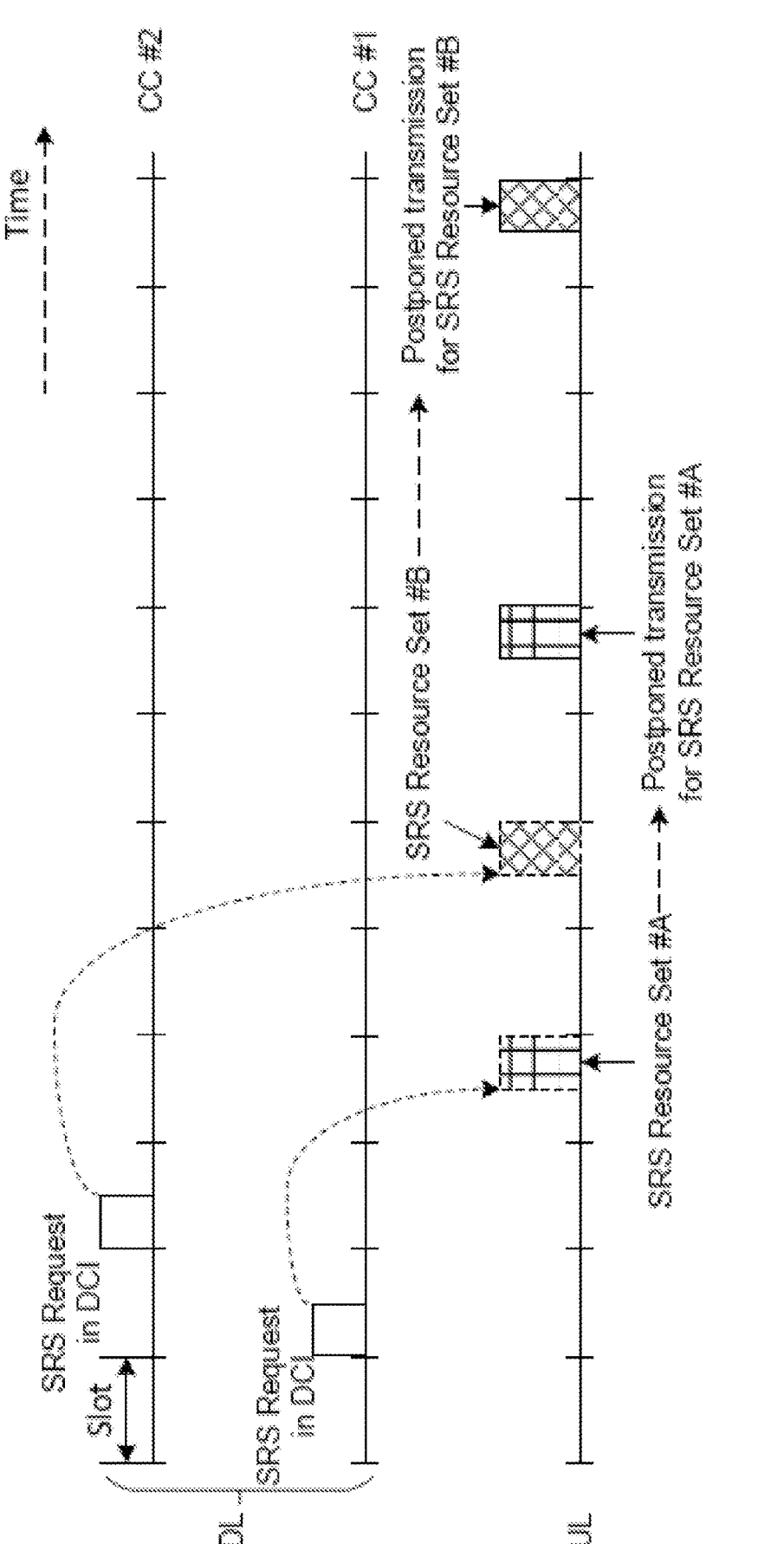
FIG. 16 illustrates independently postponed SRS transmission in accordance with some embodiments.

In an embodiment, in carrier aggregation, the postponed SRS transmission may be applied, e.g. if there is no available uplink resource/slot for the SRS transmission, then the triggered SRS may be postponed until the next available uplink slot. The postponed SRS transmission may be performed independently among different carriers. FIG. 16 illustrates independently postponed SRS transmission in accordance with some embodiments. In particular, the independently postponed SRS transmission occurs among different CCs. As shown, CC #1 triggers SRS resource set #A with slot offset of 2 in slot #N, and the SRS resource set #A transmission is postponed to slot #N+6. Between Slot #N and slot #N+6, CC #2 triggers another SRS resource set, SRS resource set #B. In this case, SRS resource set #B is not transmitted in slot #N+6 and is further postponed to slot #N+10. In another example, assuming the available uplink slot for SRS transmission is slot M, a window may be defined for the postponed transmission, for example, X slots. During the period from slot M-X to slot M, if the first triggered SRS is from CC #A, then slot M is used to transmit the SRS triggered by CC #A. The SRS triggered by another CC, CC #B, during the period from slot M-X to slot M is further postponed after slot M. Furthermore, if multiple SRS are triggered by C #A during slot M-X to slot M, then the most recent SRS triggered by C #A during slot M-X to slot M is transmitted in slot M.

In another embodiment, in carrier aggregation, collision may occur for the SRS triggered by different CCs in the following examples: multiple CCs trigger the same SRS resource set to be transmitted in the same slot; multiple CCs trigger different SRS resource sets to be transmitted in the same slot; and the SRS resource sets triggered by different CCs are postponed to the same slot.

In this case, a dropping rule may be developed to handle the overlap. In one example, if collision happens, one of the following options may be applied to determine which SRS should be sent: the SRS triggered by the CC with the lowest or the highest CC ID is transmitted and others are dropped; the SRS with the lowest or the highest SRS Resource Set ID is transmitted and others are dropped; the SRS with a predetermined usage is transmitted (SRS usage having different priorities—for example, codebook/non-codebook-based transmission is prioritized); the most recent triggered SRS is sent and others are dropped; or assuming the available uplink slot for SRS transmission is slot M, a window may be defined, for example, X slots. In this last case, during the period from slot M-X to slot M, if the first triggered SRS is from CC #A, then slot M is used to transmit the SRS triggered by CC #A. Furthermore, if multiple SRS are triggered by CC #A during slot M-X to slot M, then the most recent SRS triggered by CC #A during slot M-X to slot M is transmitted in slot M. Other SRS triggered during slot M-X to slot M are dropped.

Figure 17:
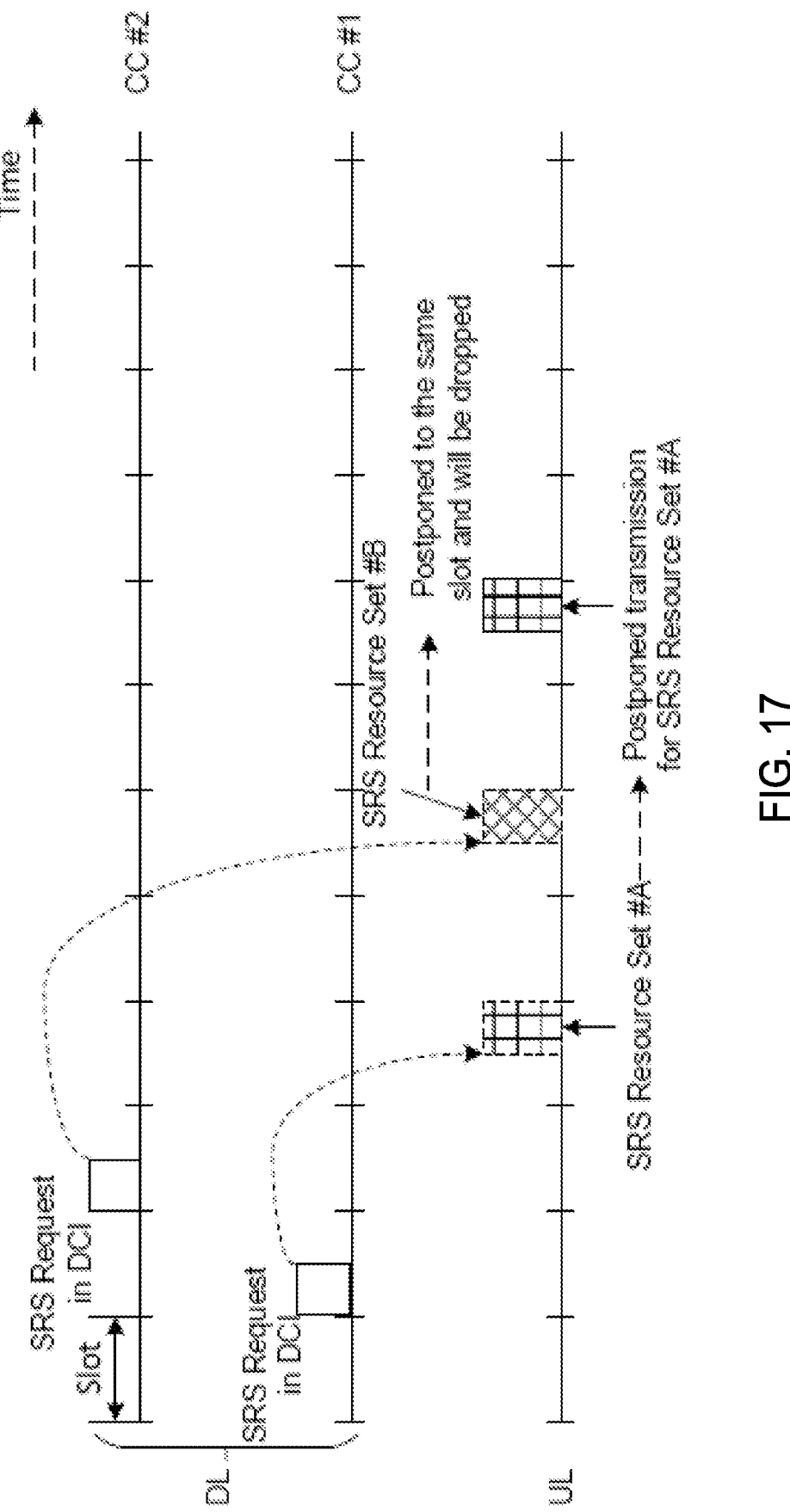
FIG. 17 illustrates SRS collision handling in accordance with some embodiments.

In another example, if a collision happens, then the SRS triggered by the CC whose ID equals to (slotNumber mod 2) is transmitted. FIG. 17 illustrates SRS collision handling in accordance with some embodiments. In particular, the SRS in FIG. 17 are triggered by multiple CCs. As shown, the SRS triggered by the CC with the lowest CC ID is transmitted.

For PUSCH transmissions, the information bits are scrambled prior to modulation, as shown below:

6.3.1 Physical Uplink Shared Channel 6.3.1.1 Scrambling

For the single codeword q, the block of bits $$b^{(q)}(0), \ldots, b^{(q)}\left(M_{bit}^{(q)} - 1\right), \text{ where } M_{bit}^{(q)}$$

is the number of bits transmitted in codeword q transmitted on the physical channel, shall be scrambled prior to modulation, resulting in a block of scrambled bits $$\tilde{b}^{(q)}(0), \ldots, \tilde{b}^{(q)}\left(M_{bit}^{(q)} - 1\right)$$

according to the following pseudo code

```
while i < M_bit^(q)
    if b^(q)(i) = x // UCI placeholder bits
        b̃^(q)(i) = 1
    else
        if b^(q)(i) = y   // UCI placeholder bits
            b̃^(q)(i) = b̃^(q)(i - 1)
        else
            b̃^(q)(i) = (b^(q)(i) + c^(q)(i))mod2
        end if
    end if
    i = i + 1
end while
``` where x and y are tags defined in 3GPP TS 38.212 and where the scrambling sequence $c^{(q)}(i)$ is given by clause 5.2.1. The scrambling sequence generator shall be initialised with $$c_{init} = \begin{cases} n_{RNTI} \cdot 2^{16} + n_{RAPID} \cdot 2^{10} + n_{ID} & \text{for } msgA \text{ on } PUSCH \\ n_{RNTI} \cdot 2^{15} + n_{ID} & \text{otherwise} \end{cases}$$

where $n_{ID} \in (0, 1, \ldots, 1023)$ equals the higher-layer parameter dataScramblingIdentityPUSCH if configured and the RNTI equals the C-RNTI, MCS-C-RNTI, SP-CSI-RNTI or CS-RNTI, and the transmission is not scheduled using DCI format 0_0 in a common search space $n_{ID} \in \{0, 1, \ldots, 1023\}$ equals the higher-layer parameter msgA-dataScramblingIdentityPUSCH if configured and the PUSCH transmission is triggered by a Type-2 random access procedure as described in clause 8.1A of [TS 38.213]

$$n_{ID} = N_{ID}^{cell} \text{ otherwise}$$

$n_{RAPID}$ is the index of the random-access preamble transmitted for msgA as described in clause 5.1.3A of [TS 38.321];

The scrambling code is provided by dataScramblingIdentityPUSCH. However, in multi-TRP operation, the PUSCH transmission may target at different TRPs, therefore, multiple scrambling codes are configured to the UE in the scenario of multi-TRP operation. The current PUSCH scrambling operation doesn't consider multi-TRP operation. Thus, among others, embodiments are directed to PUSCH scrambling in the scenario of multi-TRP operation.

PUSCH Scrambling Sequence Configuration in Multi-DCI Multi-TRP

In an embodiment, for PUSCH transmissions, an additional scrambling sequence can be applied in multi-DCI multi-TRP (including multi-TRP operation with same physical cell ID or different physical cell ID). In PUSCH-Config, a new parameter, additionaldataScramblingIdentityPUSCH may be added, as shown below:

```
PUSCH-Config                              SEQUENCE {
    dataScramblingIdentityPUSCH           INTEGER (0..1023)
OPTIONAL,    -- Need S
    additionaldataScramblingIdentityPUSCH     INTEGER (0..1023)
OPTIONAL,    -- Need S
    txConfig                              ENUMERATED
{codebook, nonCodebook}   OPTIONAL,    -- Need S
...
...
}
```

For a PUSCH scheduled by a CORESET with CORESETPoolIndex equal to 0, then the existing dataScramblingIdentityPUSCH is applied for PUSCH scrambling. For a PUSCH scheduled by a CORESET with CORESETPoolIndex equal to 1, then the new parameter additionaldataScramblingIdentityPUSCH is applied for PUSCH scrambling.

PUSCH Scrambling Sequence Configuration in Single DCI Multi-TRP

In an embodiment, for PUSCH transmission, an additional scrambling sequence can be applied in single DCI multi-TRP (including multi-TRP operation with same physical cell ID or different physical cell ID). In the PUSCH-Config, the new parameter additionaldataScramblingIdentityPUSCH above may be added.

Figure 18:
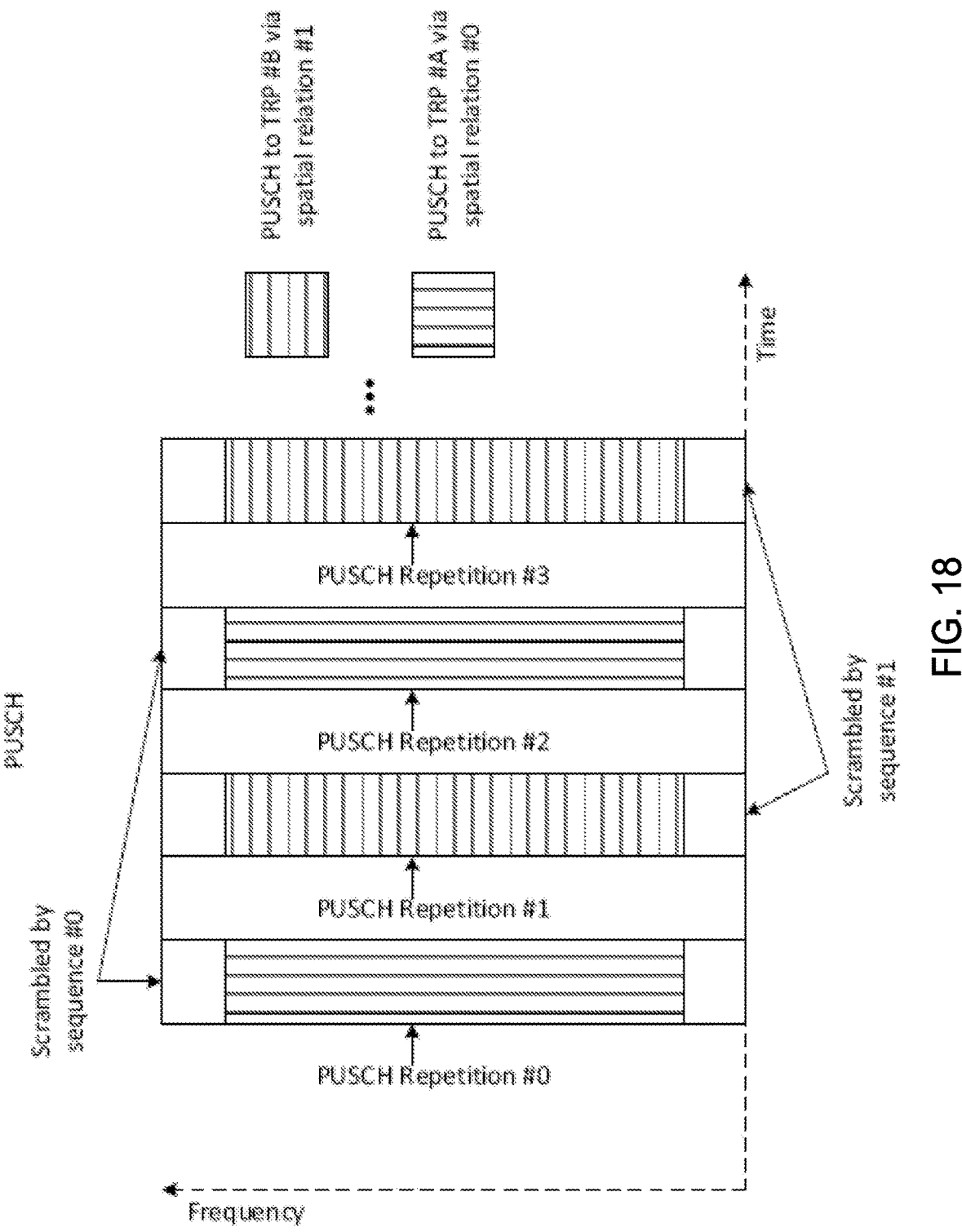
FIG. 18 illustrates PUSCH scrambling in accordance with some embodiments.
Figure 19:
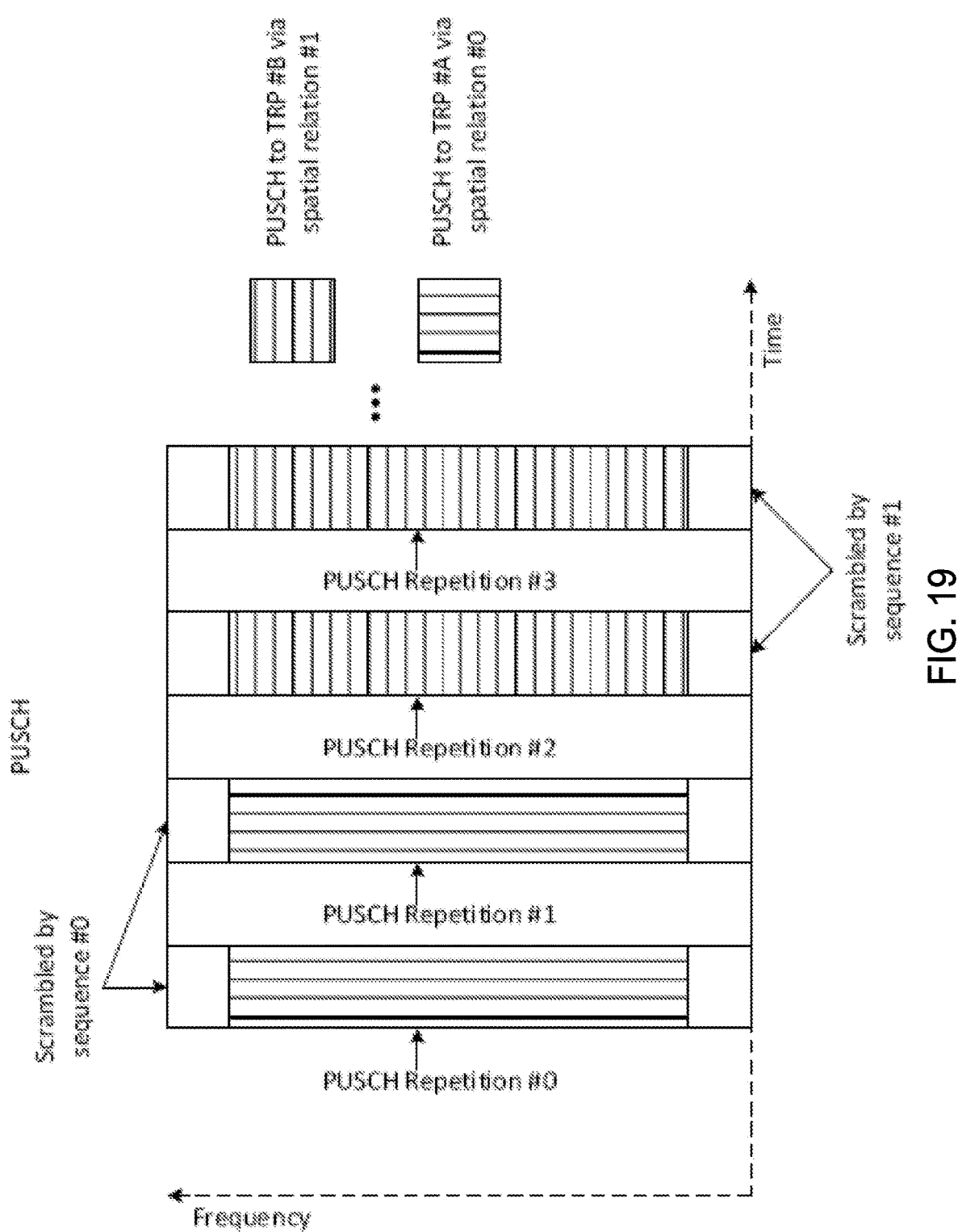
FIG. 19 illustrates another PUSCH scrambling in accordance with some embodiments.

If the PUSCH is transmitted with TDMed repetitions with single DCI multi-TRP, the PUSCH repetitions targeting at different TRPs are scrambled with different sequences. FIG. 18 illustrates PUSCH scrambling in accordance with some embodiments; FIG. 19 illustrates another PUSCH scrambling in accordance with some embodiments. In each of FIGS. 18 and 19, the scrambling is for a PUSCH with repetitions in a single DCI multi-TRP.

In a single DCI multi-TRP, the CORESET may also be associated with one TRP. The CORESET pool may also be defined for single DCI multi-TRP. The association between CORESET and TRP may be defined by an RRC parameter, for example, singleDCI-CORESETPoolIndex. If the RRC parameter singleDCI-CORESETPoolIndex is set to 0, the CORESET is sent from TRP #A; if the RRC parameter singleDCI-CORESETPoolIndex is set to 1, the CORESET is sent from TRP #B.

For example, If the PUSCH transmission is targeting at TRP #A, then the existing parameter dataScramblingIdentityPUSCH is applied for PUSCH scrambling. If the PUSCH transmission is targeting at TRP #B, then the new parameter additionaldataScramblingIdentityPUSCH is applied for PUSCH scrambling. Further, which TRP the PUSCH transmission is targeting may be identified by the association between the spatial relation for PUSCH transmission and the TRP (singleDCI-CORESETPoolIndex). In an example, if the spatial relation for PUSCH transmission is indicated by the SRI, then the association between the SRS and the TRP may be defined. For example, a parameter associatedTRP-SRS may be introduced, and may be defined in the SRS resource (SRS-Resource) or the SRS spatial relation info (SRS-SpatialRelationInfo). In another example, for a PUSCH with repetitions, which TRP the PUSCH repetition is targeting and which scrambling sequence is applied for the PUSCH repetition may be pre-defined or implicitly determined, as shown in FIGS. 18 and 19. For example, the first repetition is sent to TRP #A, the second repetition is sent to TRP #B, and so on.

In another embodiment, which scrambling sequence is applied for PUSCH transmission is identified by the scheduling CORESET. For a PUSCH scheduled by a CORESET with singleDCI-CORESETPoolIndex equals to 0, then the existing dataScramblingIdentityPUSCH is applied for PUSCH scrambling. For a PUSCH scheduled by a CORESET with singleDCI-CORESETPoolIndex equal to 1, then the new parameter additionaldataScramblingIdentityPUSCH is applied for PUSCH scrambling.

The current default beam operation for SRS/PUCCH/PUSCH doesn't consider multi-TRP operation. Among others, embodiments also provide for default beam operation for PUSCH transmissions in the scenario of multi-TRP operation.

Default PUSCH Spatial Relation in Multi-TRP with Single DCI

1. PUSCH without Repetitions

In an embodiment, in a single DCI multi-TRP, the PUSCH may not be configured with repetitions. If the parameter enableDefaultBeamPlForPUSCH0_0 is set to 'disabled', the UE is not expected to be scheduled by DCI format 0_0 from one TRP over which there is no PUCCH resources configured with spatial relation. If there is at least one PUCCH resource configured with a spatial relation associated with the TRP, then the spatial relation/pathloss reference signal for the PUSCH scheduled by DCI format 0_0 follows the spatial relation of the PUCCH resource with the lowest resource ID associated with the TRP.

If the parameter enableDefaultBeamPlForPUSCH0_0 is set to 'enabled', the default spatial relation for the PUSCH may be determined as described in the following.

Another parameter may be introduced indicating whether default beam operation is enabled or not for a PUSCH scheduled by a DCI format other than DCI 0_0, i.e., enableDefaultBeamForPUSCH. If enableDefaultBeamForPUSCH is set to 'disabled', the PUSCH scheduled by the non-DCI format 0_0 follows the (default) spatial relation of the indicated SRS resource. If enableDefaultBeamForPUSCH is set to 'enabled', then the spatial relation of the PUSCH may be determined as described in the following sections. In another example, if enableDefaultBeamForPUSCH is set to enabled, then the PUSCH spatial relation may follow the (default) spatial relation of the SRS in which the SRS resource is associated with one (default) spatial relation, or the PUSCH spatial relation may follow the (default) spatial relation of one specific PUCCH resource in which the PUCCH resource is associated with multiple (default) spatial relations.

1.1 Single TCT State per CORESET

In an embodiment, in a single DCI multi-TRP, if the CORESET is configured with only one active TCI state, and if the parameter enableDefaultBeamPlForPUSCH0_0 is set to 'enabled', or the parameter 'enableDefaultBeamForPUSCH' is set to 'enabled', the default spatial relation/ pathloss reference signal for PUSCH is determined as below:

Alt 1: to follow the scheduling CORESET: the default spatial relation/pathloss reference signal of the PUSCH follows the TCI state/QCL assumption of the scheduling CORESET.

Alt 2: to follow one specific CORESET: the default spatial relation/pathloss reference signal of the PUSCH follows the TCI state/QCL assumption of the CORESET with the lowest ID in the latest slot prior to the PUSCH transmission in which such a CORESET is monitored.

Figure 20:
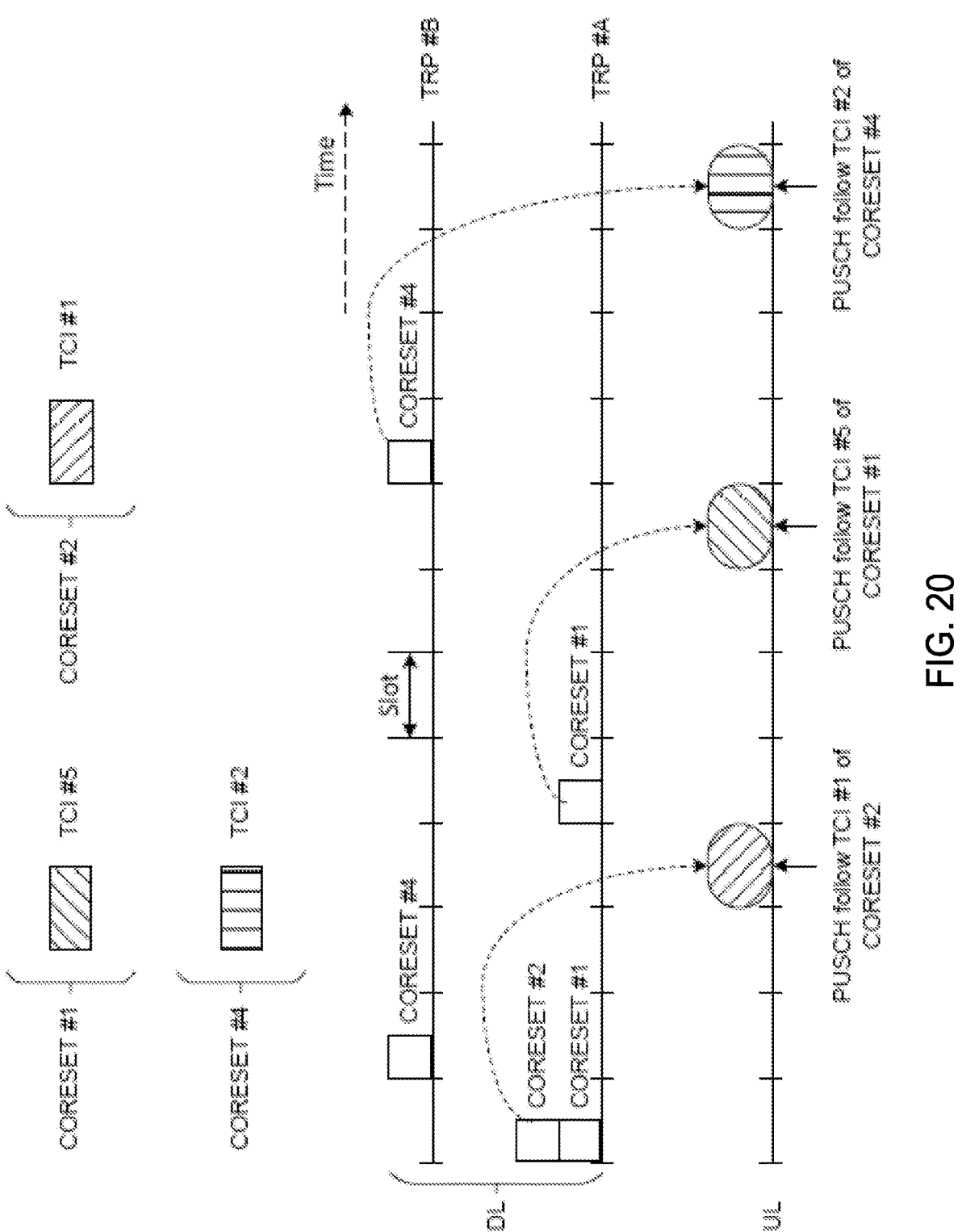
FIG. 20 illustrates a default spatial relation for PUSCH without repetition in accordance with some embodiments.

FIG. 20 illustrates a default spatial relation for PUSCH without repetition in accordance with some embodiments. In particular, FIG. 20 shows an example of Alt 1, in which a single TCI is provided per CORESET.

1.2 Multiple TCI States Per CORESET

In an embodiment, in a single DCI multi-TRP, the CORESET may be configured with multiple active TCI states. In this case, the CORESET is associated with one TRP, for example, the CORESET may be configured with singleDCI-CORESETPoolIndex. The TCI state is also associated with one TRP, for example, the TCI state may be configured with associatedTRP-TCI.

If the parameter enableDefaultBeamPlForPUSCH0_0 is set to 'enabled', or the parameter 'enableDefaultBeamForPUSCH' is set to 'enabled', the default spatial relation/ pathloss reference signal for PUSCH is determined as below:

Alt 1: to follow one TCI state of the scheduling CORESET: the default spatial relation/pathloss reference signal of the PUSCH follows the TCI state/QCL assumption of the scheduling CORESET, and the TCI state is associated to the same TRP as the scheduling CORESET.

Alt 2: to follow one TCI state of one specific CORESET with multiple TCI states: the default spatial relation/pathloss reference signal of the PUSCH follows the TCI state/QCL assumption of the CORESET with the lowest ID among those CORESETs that has multiple active TCI states, in the latest slot prior to the PUSCH transmission in which such a CORESET is monitored. The TCI state is associated to the same TRP as the scheduling CORESET.

Alt 3: to follow the TCI of one specific CORESET with only one TCI state: the default spatial relation/pathloss reference signal of the PUSCH follows the TCI state/QCL assumption of the CORESET with the lowest ID among those CORESETs that has only one active TCI state, in the latest slot prior to the PUSCH transmission in which such a CORESET is monitored.

Figure 21:
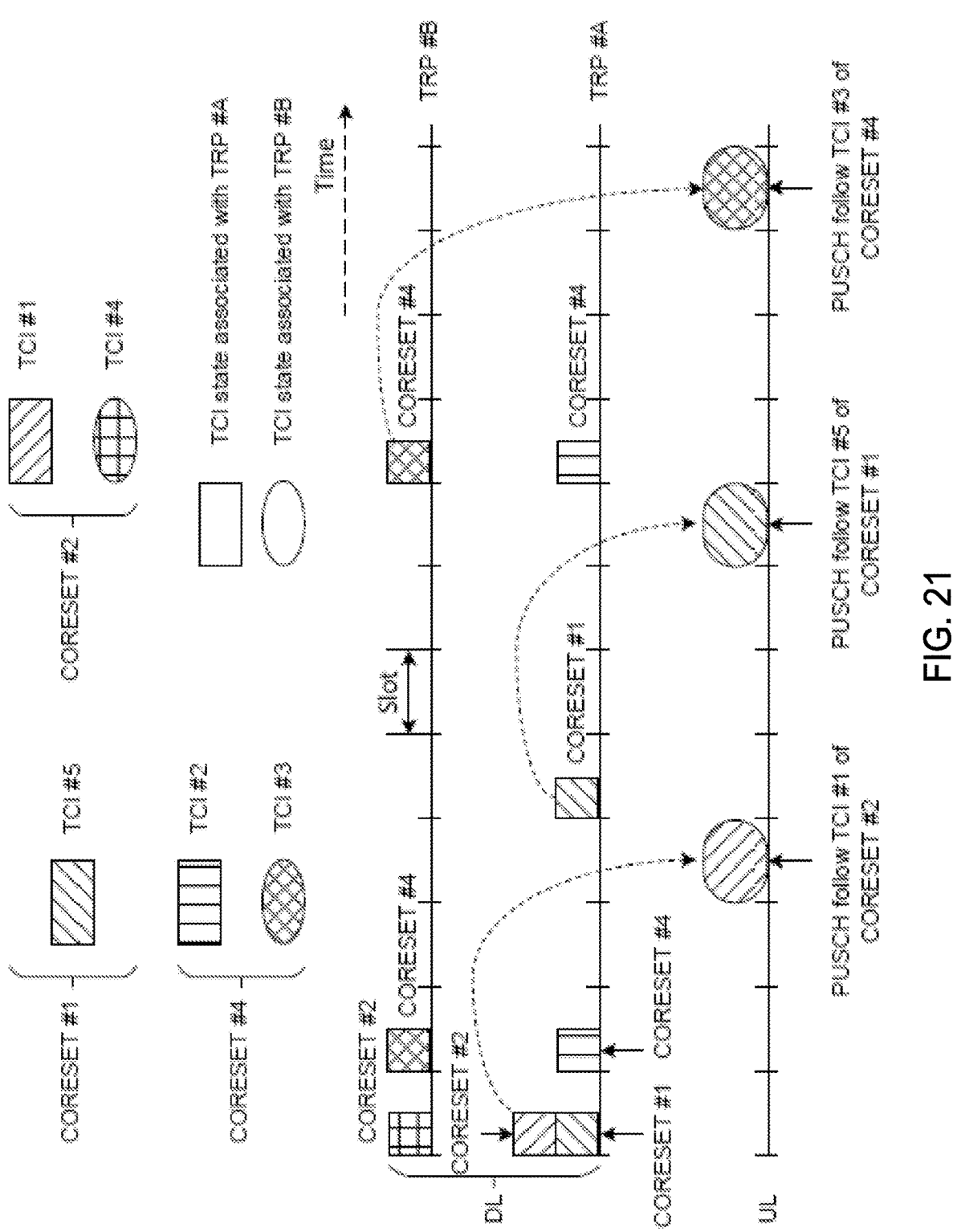
FIG. 21 illustrates another default spatial relation for PUSCH without repetition in accordance with some embodiments.

FIG. 21 illustrates another default spatial relation for PUSCH without repetition in accordance with some embodiments. In particular, FIG. 21 shows an example of Alt 1, in which multiple TCIs are provided per CORESET.

2. PUSCH with Repetitions

In an embodiment, in single a DCI multi-TRP, the PUSCH may be configured with repetitions. Another parameter may be introduced indicating whether multiple default beams are enabled or not for a PUSCH with repetitions, i.e., enableMultipleDefaultBeamsForPUSCH. In this case, if the parameter enableDefaultBeamPlForPUSCH0_0 is set to 'enabled', or the parameter enableMultipleDefaultBeams-ForPUSCH is set to 'enabled', the default spatial relation for the PUSCH may be determined as described in the following sections. In another example, if enableMultipleDefault-BeamsForPUSCH is set to enabled, then the PUSCH spatial relations may follow the (default) spatial relations of the SRS in which the SRS resource is associated with multiple (default) spatial relations, or may follow the (default) spatial relations of one specific PUCCH resource in which the PUCCH resource is associated with multiple (default) spatial relations.

2.1 Single TCT State Per CORESET

In an embodiment, in a single DCI multi-TRP, if the CORESET is configured with only one active TCI state, the CORESET is associated with one TRP, for example, the CORESET may be configured with singleDCI-CORESET-PoolIndex. For PUSCH transmission with repetitions, if the parameter enableDefaultBeamPlForPUSCH0_0 is set to 'enabled', or the parameter 'enableMultipleDefaultBeams-ForPUSCH' is set to 'enabled', multiple default spatial relations/pathloss reference signals are applied. The default spatial relations/pathloss reference signals for PUSCH are determined as below:

Alt 1: the multiple spatial relations of the PUSCH dynamically and independently follow one CORESET: the first default spatial relation/pathloss reference signal of the PUSCH follows the TCI state/QCL assumption of the CORESET with the lowest ID among those CORESETs whose singleDCI-CORESETPoolIndex is set to 0. The second default spatial relation/pathloss reference signal of the PUSCH follows the TCI state/QCL assumption of the CORESET with the lowest ID among those CORESETs whose singleDCI-CORESETPoolIndex is set to 1.

Alt 2: the multiple spatial relations of the PUSCH semi-statically follow the multiple TCI states indicated by one TCI state codepoint: the default spatial relations/pathloss reference signals of the PUSCH sequentially follows the TCI-states corresponding to the lowest codepoint among those TCI codepoints containing two different TCI states that are activated for the PDSCH.

Figure 22:
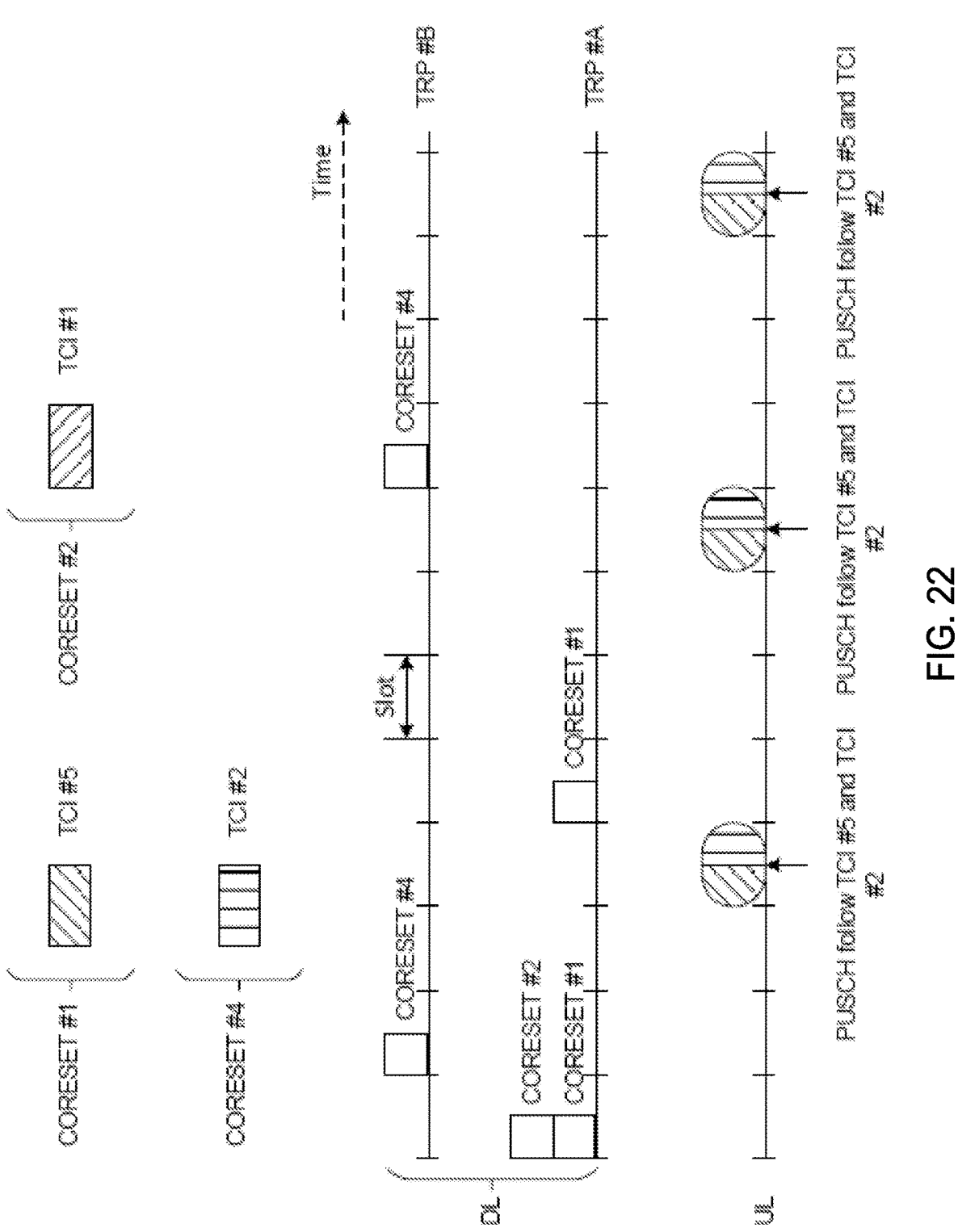
FIG. 22 illustrates a default spatial relation for PUSCH with repetition in accordance with some embodiments.

FIG. 22 illustrates a default spatial relation for PUSCH with repetition in accordance with some embodiments. FIG. 22 shows an example of Alt 1, in which a single TCI is provided per CORESET.

Figure 23:
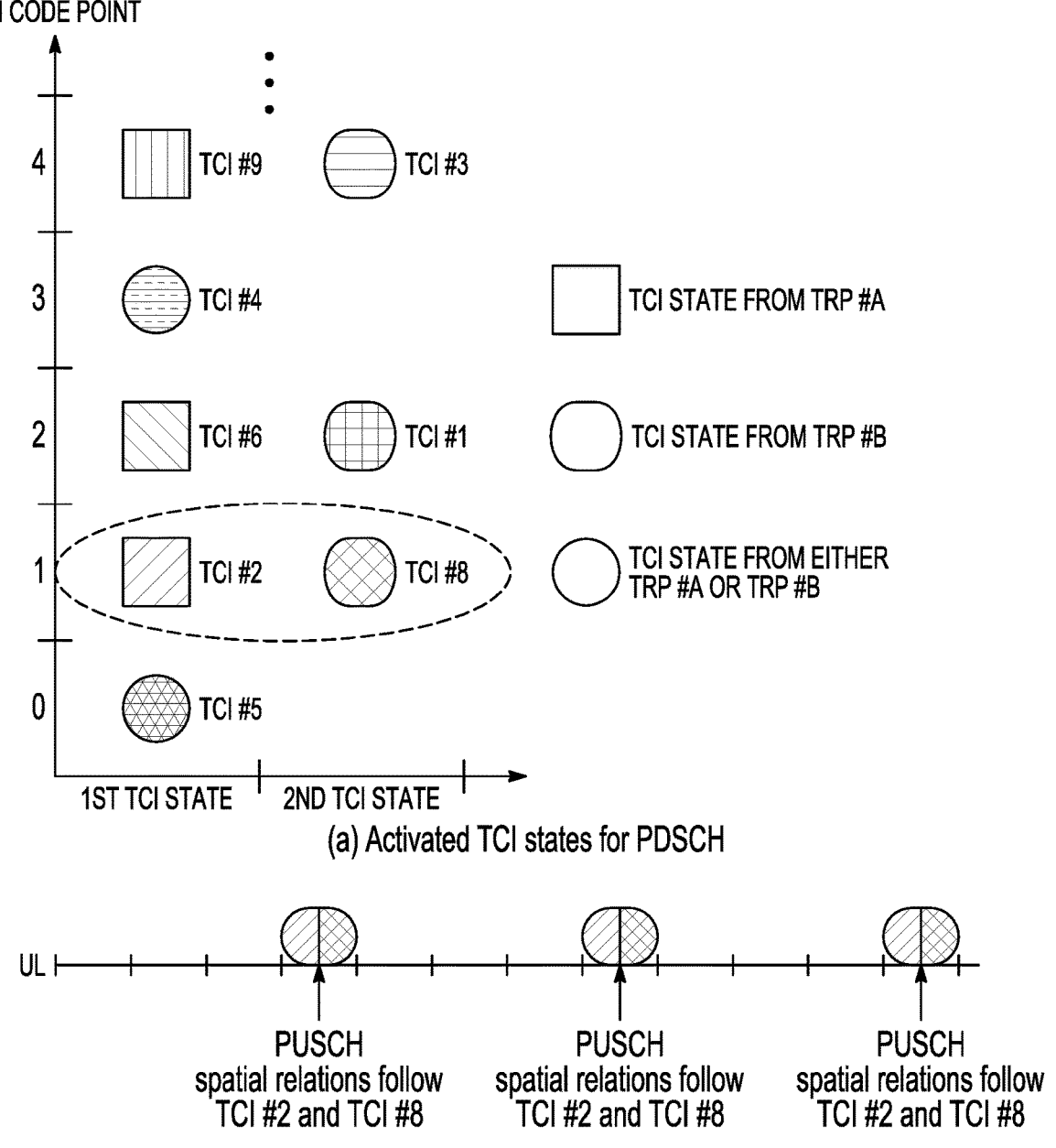
FIG. 23 illustrates another default spatial relation for PUSCH with repetition in accordance with some embodiments.

FIG. 23 illustrates another default spatial relation for PUSCH with repetition in accordance with some embodiments. In particular, FIG. 23 shows an example of Alt 2, in which a single TCI is provided per CORESET.

2.2 Multiple TCI States Per CORESET

In an embodiment, in a single DCI multi-TRP, the CORESET may be configured with multiple active TCI states. In this case, the CORESET is associated with one TRP, for example, the CORESET may be configured with singleDCI-CORESETPoolIndex. The TCI state is also associated with one TRP, for example, the TCI state may be configured with associatedTRP-TCI.

For PUSCH transmission with repetitions, if the parameter enableDefaultBeamPlForPUSCH0_0 is set to 'enabled', or the parameter 'enableMultipleDefaultBeamsForPUSCH' is set to 'enabled', multiple default spatial relations/pathloss reference signals are applied. The default spatial relations/pathloss reference signals for PUSCH is determined as below:

Alt 1: the multiple spatial relations of PUSCH dynamically follow one CORESET: the default spatial relations/pathloss reference signals of the PUSCH sequentially follows the TCI states/QCL assumptions of the CORESET with the lowest ID among those CORESETs which has multiple active TCI states, in the latest slot prior to the PUSCH transmission in which such a CORESET is monitored.

Alt 2: the multiple spatial relations of PUSCH semi-statically follow the multiple TCI states indicated by one TCI state codepoint: the default spatial relations/pathloss reference signals of the PUSCH sequentially follows the TCI-states corresponding to the lowest codepoint among those TCI codepoints containing two different TCI states that are activated for the PDSCH.

Alt 3: the multiple spatial relations of PUSCH follow the scheduling CORESET: the default spatial relations/pathloss reference signals of the PUSCH sequentially follows the TCI-states of the scheduling CORESET if the scheduling CORESET is configured with multiple active TCI states.

Figure 24:
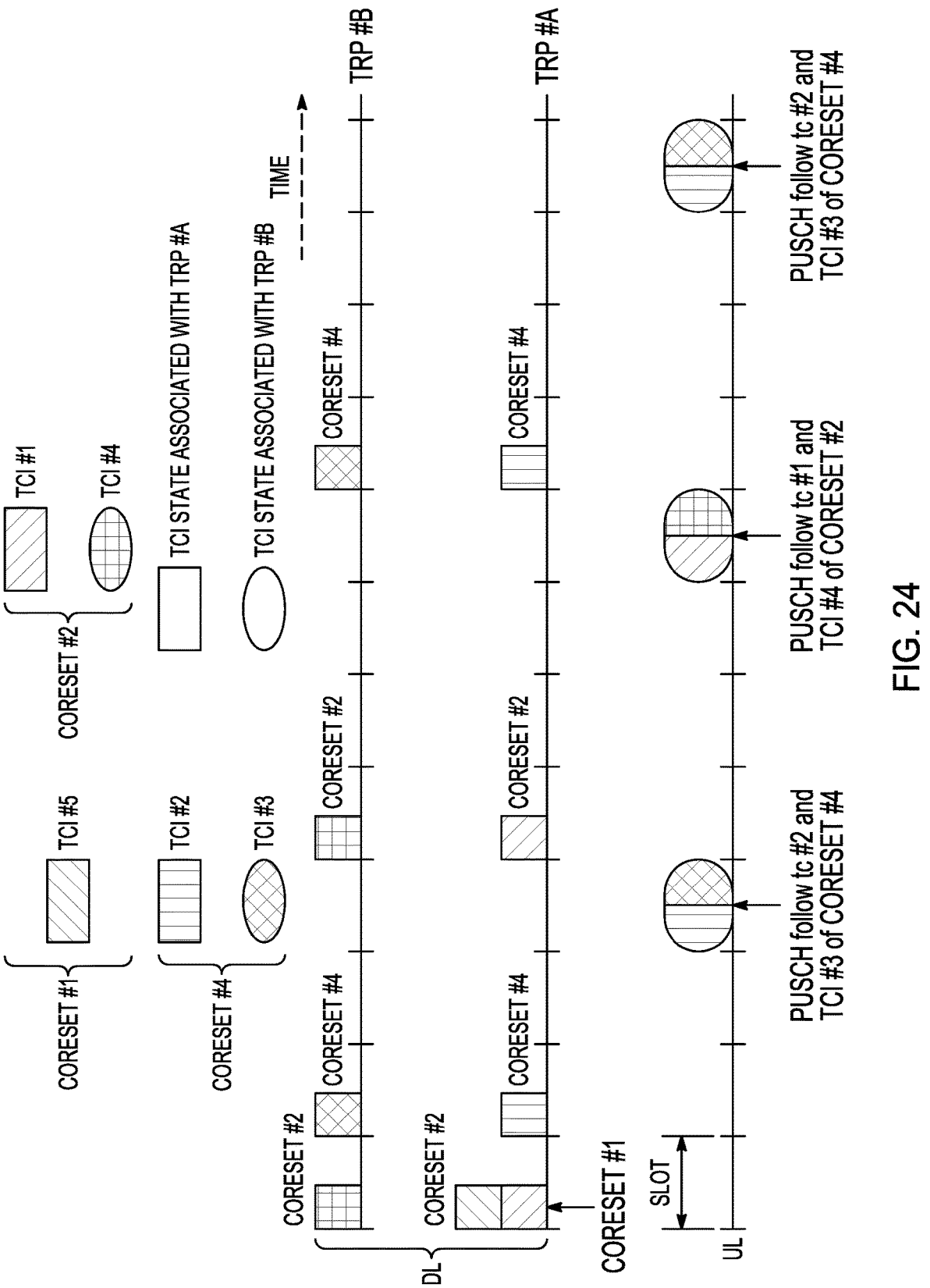
FIG. 24 illustrates a default spatial relation for PUSCH with repetition in accordance with some embodiments.

FIG. 24 illustrates a default spatial relation for PUSCH with repetition in accordance with some embodiments. FIG. 24 shows an example of Alt 1, in which multiple TCIs are provided per CORESET.

Figure 25:
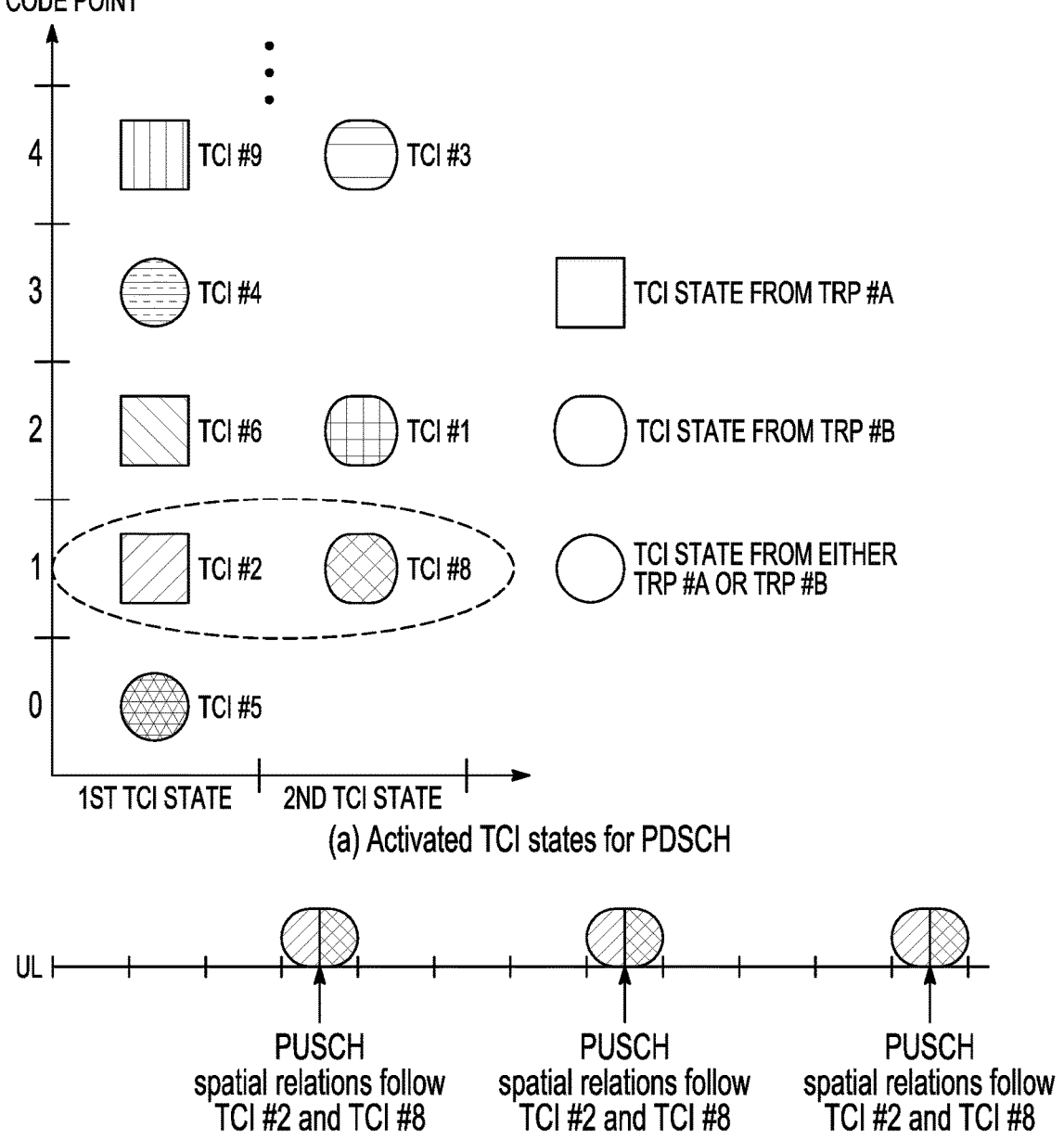
FIG. 25 illustrates another default spatial relation for PUSCH with repetition in accordance with some embodiments.

FIG. 25 illustrates another default spatial relation for PUSCH with repetition in accordance with some embodiments. In particular, FIG. 23 shows an example of Alt 2, in which multiple TCIs are provided per CORESET.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus of a transmission-reception point (TRP), the apparatus comprising:

processing circuitry configured to:

determine that multiple Downlink Control Information (DCIs) are to be used for multi-TRP operation, for a plurality of TRPs that includes the TRP, with a user equipment (UE);

indicate, to the UE, a number of spatial relations used for an uplink (UL) transmission, the UL transmission selected from a set of UL transmissions that include a physical uplink control channel (PUCCH), physical uplink shared channel (PUSCH), and sounding reference signal (SRS) from the UE;

indicate, to the UE, a spatial relation between reception of a control resource set (CORESET) and the UL transmission, the spatial relation dependent on a number of spatial relations used, the spatial relation based on an association that is dependent on which of a single spatial relation is used or multiple spatial relations are used, the association selected from a default association, an explicit association, and an implicit association between each TRP and at least one of a CORESET or a Transmission Configuration Indication (TCI) state;

receive the UL transmission from the UE based on the spatial relation; and in response to a determination that default beam operation is enabled for the UL transmission:

avoid transmission of an update of the spatial relation to the UE for the PUCCH or SRS, and schedule the PUSCH via a DCI format even if no PUCCH resource is available or a PUCCH resource is configured but has no configured spatial relation; and a memory configured to store the spatial relation.

2. The apparatus of claim 1, wherein:

at least one of:

for SRS transmission, each SRS resource is associated with a different spatial relation, an association between each periodic, semi-persistent or aperiodic SRS transmission and a different TRP is defined at an SRS resource level or SRS resource set level by at least one of:

a radio resource control (RRC) parameter associatedCORESETPool-SRS that indicates which CORESET pool is associated with the SRS resource or SRS resource set, a medium access control (MAC) control element (MAC-CE), or an implicit association by a scheduling PDCCH, for PUCCH transmission, each PUCCH is associated with a different spatial relation, or an association between each PUCCH and a different TRP is defined at an PUCCH resource level, PUCCH resource set level or PUCCH resource group level by at least one of:

a RRC parameter associatedCORESETPool-PUCCH that indicates which CORESET pool is associated with the PUCCH resource level, PUCCH resource set level or PUCCH resource group level, a PUCCH resource group identifier (ID) or PUCCH resource set ID, a medium access control (MAC) control element (MAC-CE), or if a PUCCH resource is indicated by one of the DCIs, an implicit association by a CORESET pool of the scheduling PDCCH.

3. The apparatus of claim 1, wherein:

at least one of:

for SRS transmission:

a default spatial relation for SRS transmission is applied if a radio resource control (RRC) parameter enableDefaultBeamPlForSRS is enabled and the spatial relation is not configured for the SRS, the default spatial relation follows a TCI state of a lowest indexed CORESET among CORESETs whose configured CORESETPoolindex and CORESET pool associated with the SRS are the same, in a latest slot in which one or more CORESETs whose configured CORESETPoolindex is the same as the CORESET pool associated with the SRS are monitored by the UE, and if no SRS transmission is present, the latest slot is prior to a corresponding PUSCH transmission, the CORESET pool associated with the SRS is indicated an RRC parameter associatedCORESETPool-SRS or is the same as a scheduling CORESET if the SRS is indicated by one of the DCIs, and for aperiodic SRS triggered by one of the DCIs, and the default spatial relation follows the TCI state of the scheduling CORESET, and, if no CORESET is configured in an active bandwidth part (BWP) within the CORESET pool associated with the SRS resource, the default spatial relation follows an activated TCI state with a lowest TCI identifier (ID) for a physical downlink shared channel (PDSCH) within the CORESET pool associated with the SRS resource, or for PUCCH transmission:

a default spatial relation for PUCCH transmission is applied if a RRC parameter enableDefaultBeamPlForPUCCH is enabled and the spatial relation is not configured for the PUCCH, the default spatial relation follows a TCI state of a lowest indexed CORESET among CORESETs whose configured CORESETPoolindex and CORESET pool associated with the PUCCH are the same, in a latest slot in which one or more CORESETs whose configured CORESETPoolindex is the same as the CORESET pool associated with the PUCCH are monitored by the UE, the CORESET pool associated with the PUCCH is indicated an RRC parameter associatedCORESETPool-PUCCH or is the same as the scheduling CORESET if the PUCCH is indicated by one of the DCIs, and the default spatial relation follows the TCI state of the scheduling CORESET, and, if no CORESET is configured in an active bandwidth part (BWP) within the CORESET pool associated with the SRS resource, the default spatial relation follows the activated TCI state with the lowest TCI ID for the PDSCH within the CORESET pool associated with the PUCCH.

4. The apparatus of claim 1, wherein for a radio resource control (RRC) parameter enableDefaultBeamPlForPUSCH0_0:

set to disabled, one of:

the processing circuitry is configured to avoid scheduling of the UE occurs by DCI format 0_0 from one of the TRPs indicated by a RRC parameter CORESETPoolIndex over which no PUCCH resources are configured with spatial relation, and, if there is at least one PUCCH resource configured with a spatial relation over the one of the TRPs, a spatial relation for a PUSCH scheduled by DCI format 0_0 follows a spatial relation of a PUCCH resource with a lowest resource identification (ID) over the one of the TRPs indicated by RRC parameters CORESETPoolIndex and associatedCORESETPool-PUCCH, or independent of whether a PUCCH resource is configured over a scheduling TRP and independent of whether the PUCCH resource configured over the scheduling TRP is configured with a particular spatial relation, a default spatial relation for the PUSCH scheduled by DCI format 0_0 follows one of:

a TCI state of a CORESET with a lowest ID within a CORESET pool that is the same as a CORESET pool of a scheduling CORESET in a latest slot prior to a PUSCH transmission in which the CORESET with the lowest ID is monitored, or a TCI state of the scheduling CORESET, and set to enabled, one of:

the default spatial relation of the PUSCH scheduled by DCI 0_0 follows the TCI state of the CORESET with the lowest ID within the CORESET pool that is the same as the CORESET pool of the scheduling CORESET in the latest slot prior to the PUSCH transmission in which the CORESET with the lowest ID is monitored, the default spatial relation of the PUSCH scheduled by DCI 0_0 follows the TCI state of the scheduling CORESET, or if no PUCCH resource is configured on a scheduling TRP that transmits the scheduling CORESET, the default spatial relation follows the TCI state of the CORESET with the lowest ID within the CORESET pool that is the same as the CORESET pool of the scheduling CORESET in the latest slot prior to the PUSCH transmission in which the CORESET with the lowest ID is monitored, and if PUCCH resources are configured but without spatial relation on the scheduling TRP, the default spatial relation follows the default spatial relation of PUCCH resources on the scheduling TRP.

5. The apparatus of claim 1, wherein:

a PUSCH scheduled by a DCI format other than 0_0, the spatial relation of the PUSCH follows a spatial relation of an SRS resource indicated by an SRS resource indicator (SRI) or an SRS resource configured by a radio resource control (RRC) parameter if only one SRS resource is configured, and if an RRC parameter enableDefaultBeamPlForSRS is set to 'enabled', the PUSCH follows a default spatial relation of a corresponding SRS resource, and if no SRS transmission is present, the default spatial relation is derived assuming the SRS is to be transmitted in a first slot of the PUSCH.

6. The apparatus of claim 1, wherein:

for a PUSCH scheduled by all DCI formats, default beam operation is indicated by a radio resource control (RRC) parameter enableDefaultBeamPlForPUSCH, and if the RRC parameter enableDefaultBeamPlForPUSCH is set to enabled, a default spatial relation for the PUSCH one of:

an SRS resource indicated by an SRS resource indicator (SRI) or an SRS resource configured by an RRC parameter if only one SRS resource is configured, a spatial relation of a PUCCH resource with a lowest resource identification (ID) that is associated with a same CORESET pool as a scheduling CORESET, a TCI state of a CORESET with a lowest ID within a CORESET pool that is the same as the CORESET pool of the scheduling CORESET in a latest slot prior to the PUSCH in which the CORESET with the lowest ID is monitored, or a TCI state of the scheduling CORESET.

7. The apparatus of claim 1, wherein an SRS trigger state indicated by a code point of an SRS Request field in one of the DCIs one of:

is TRP-specific such that the code point of the SRS Request field triggers a different SRS resource set for each different TRP, or triggers a same SRS resource set but with a different slot offset for different TRPs.

8. The apparatus of claim 1, wherein:

an association between each SRS and TRP is defined at an SRS resource set level or SRS resource level, or in a radio resource control (RRC) parameter associated-CORESETPool-SRS, multiple SRS resource sets are configured for a same usage, the same usage is selected from a set including codebook-based transmission, non-codebook-based transmission, antenna switching and beam management, the SRS resource sets with the same usage are associated with different TRPs, for codebook-based transmission, when scheduling a PUSCH transmission, an SRS resource indicator (SRI) field indicates a particular SRS resource in an SRS resource set associated with a scheduling TRP or one of the DCIs indicates the SRS resource set, or for non-codebook-based transmission, different Channel Status Information-resource (CSI-RS) resource transmissions by different TRPs are associated with different SRS resource sets, an SRI field or a field in one of the DCIs indicates one or more SRS resources in the SRS resource set associated with the scheduling TRP.

9. The apparatus of claim 1, wherein for a PUSCH at least one of:

the processing circuitry is configured to apply a scrambling sequence and indicate to the UE the scrambling sequence in a radio resource control (RRC) parameter additionaldataScramblingIdentityPUSCH in a PUSCH-Config message, the processing circuitry is configured to apply an RRC parameter dataScramblingIdentityPUSCH for PUSCH scrambling if the PUSCH is scheduled by a CORESET with a CORESETPoolIndex equal to 0, the processing circuitry is configured to apply the RRC parameter additionaldataScramblingIdentityPUSCH for PUSCH scrambling if the PUSCH is scheduled by a CORESET with a CORESETPoolIndex equal to 1, time domain modulated PUSCH repetitions targeting different TRPs are scrambled with different sequences, each CORESET is associated with a different TRP, an association between CORESET and TRP is indicated by a RRC parameter singleDCI-CORESETPoolIndex, PUCCH scrambling is dependent on the TRP targeted by the PUSCH as indicated by the RRC parameter singleDCI-CORESETPoolIndex, the spatial relation of the PUSCH is indicated by an SRS resource indicator (SRI) and one of: an association between SRS and TRP is indicated by an RRC parameter associatedTRP-SRS in an SRS resource or SRS spatial relation information, or for a PUSCH transmission with repetitions, which TRP a particular PUSCH repetition is targeting and which scrambling sequence is applied for the particular PUSCH repetition is pre-defined or implicit, or which scrambling sequence is applied for PUSCH is identified by the scheduling CORESET.

10. An apparatus of a transmission-reception point (TRP), the apparatus comprising:

processing circuitry configured to:

determine that a single Downlink Control Information (DCI) is to be used for multi-TRP operation, for a plurality of TRPs that includes the TRP, with a user equipment (UE);

indicate, to the UE, for a physical uplink shared channel (PUSCH) transmission without repetition, for a radio resource control (RRC) parameter enableDefaultBeamPlForPUSCH0_0:

set to disabled:

not to expect scheduling by DCI format 0_0 from one of the TRPs over which no PUCCH resources are configured with spatial relation, if there is at least one PUCCH resource configured with a spatial relation over the one of the TRPs, a spatial relation for a PUSCH transmission scheduled by DCI format 0_0 is to follow a spatial relation of a PUCCH resource with a lowest resource identification (ID) over the one of the TRPs, and an RRC parameter enableDefaultBeamFor-PUSCH indicates whether default beam operation is enabled for a PUSCH transmission scheduled by a DCI format other than DCI 0_0, or set to enabled or the RRC parameter enableDefaultBeamForPUSCH is set to enabled, and a control resource set (CORESET) is configured with only one active Transmission Configuration Indication (TCI) state: a default spatial relation of the PUSCH transmission is to follow a scheduling TCI state of one of a scheduling CORESET or another TCI state of a lowest ID CORESET having a lowest ID in a latest slot prior to the PUSCH transmission in which the lowest ID CORESET is monitored; and receive an uplink (UL) transmission from the UE based on the spatial relation; and a memory configured to store the default spatial relation, wherein for a CORESET associated with one TRP and configured with multiple active TCI states with a RRC parameter singleDCI-CORESETPoolIndex, and the active TCI states are associated with the one TRP and are configured with a RRC parameter associatedTRP-TCI.

11. The apparatus of claim 10, wherein if an RRC parameter enableDefaultBeamPlForPUSCH0_0 or enableDefaultBeamForPUSCH is set to enabled, the default spatial relation for the UE to follow is:

the scheduling TCI state, and the scheduling TCI state is associated to a same TRP as the scheduling CORESET, the other TCI state of the lowest ID CORESET, among CORESETs that each have multiple active TCI states, in the latest slot prior to the PUSCH transmission in which the CORESETs are monitored, and the other TCI state is associated to the same TRP as the scheduling CORESET, or the other TCI state of the lowest ID CORESET, among CORESETs that each have a single active TCI state, in the latest slot prior to the PUSCH transmission in which the CORESETs are monitored, and the other TCI state is associated to the same TRP as the scheduling CORESET.

12. The apparatus of claim 10, wherein for a PUSCH transmission configured with repetitions, the processing circuitry is configured to indicate whether multiple default beams are enabled via an RRC parameter enableMultipleDefaultBeamsForPUSCH.

13. The apparatus of claim 12, wherein:

for a CORESET associated with one TRP and configured with a single active TCI state with a RRC parameter singleDCI-CORESETPoolIndex, the single active TCI state is associated with the one TRP and configured with a RRC parameter associatedTRP-TCI, and for PUSCH transmission with repetitions, if the RRC parameter enableDefaultBeamPlForPUSCH0_0 or enableMultipleDefaultBeamsForPUSCH is set to enabled, the default spatial relation for the UE is:

to follow a first default spatial relation using a TCI state of a CORESET with a lowest ID among CORESETs whose singleDCI-CORESETPoolIndex is set to 0 and a second default spatial relation using a TCI state of a CORESET with a lowest ID among CORESETs whose singleDCI-CORESETPoolIndex is set to 1, or to sequentially follow TCI states corresponding to a lowest codepoint among TCI codepoints containing two different TCI states that are activated for PDSCH transmissions.

14. The apparatus of claim 12, wherein for a CORESET associated with one TRP and configured with multiple active TCI states with the RRC parameter singleDCI-CORESETPoolIndex, the active TCI states are associated with the one TRP and are configured with the RRC parameter associatedTRP-TCI.

15. The apparatus of claim 14, wherein:

for PUSCH transmission with repetitions, if an RRC parameter enableDefaultBeamPlForPUSCH0_0 or enableMultipleDefaultBeamsForPUSCH is set to enabled, the default spatial relation for the UE is to sequentially follow:

TCI states of a CORESET with a lowest ID among CORESETs that have multiple active TCI states, in a latest slot prior to a PUSCH transmission in which the CORESET with the lowest ID is monitored, the TCI states corresponding to a lowest codepoint among TCI codepoints containing two different TCI states that are activated for PDSCH transmissions, or TCI states of the scheduling CORESET if the scheduling CORESET is configured with multiple active TCI states.

16. A non-transitory computer-readable storage medium that stores instructions for execution by one or more processors of transmission-reception point (TRP), the one or more processors to configure the TRP to, when the instructions are executed:

determine that multiple Downlink Control Information (DCIs) are to be used for multi-TRP operation, for a plurality of TRPs that includes the TRP, with a user equipment (UE);

indicate, to the UE, a number of spatial relations used for an uplink (UL) transmission, the UL transmission selected from a set of UL transmissions that include a physical uplink control channel (PUCCH), physical uplink shared channel (PUSCH), and sounding reference signal (SRS) from the UE;

indicate, to the UE, a spatial relation between reception of a control resource set (CORESET) and the UL transmission, the spatial relation dependent on a number of spatial relations used, the spatial relation based on an association that is dependent on which of a single spatial relation is used or multiple spatial relations are used, the association selected from a default association, an explicit association, and an implicit association between each TRP and at least one of a CORESET or a Transmission Configuration Indication (TCI) state;

receive the UL transmission from the UE based on the spatial relation; and in response to a determination that default beam operation is enabled for the UL transmission:

avoid transmission of an update of the spatial relation to the UE for the PUCCH or SRS, and schedule the PUSCH via a DCI format even if no PUCCH resource is available or a PUCCH resource is configured but has no configured spatial relation.

17. The medium of claim 16, wherein:

a PUSCH scheduled by a DCI format other than 0_0, the spatial relation of the PUSCH follows a spatial relation of an SRS resource indicated by an SRS resource indicator (SRI) or an SRS resource configured by a radio resource control (RRC) parameter if only one SRS resource is configured, and if an RRC parameter enableDefaultBeamPlForSRS is set to 'enabled', the PUSCH follows a default spatial relation of a corresponding SRS resource, and if no SRS transmission is present, the default spatial relation is derived assuming the SRS is to be transmitted in a first slot of the PUSCH.

* * * * *